(12) United States Patent
Brownrigg, Jr. et al.

(10) Patent No.: US 8,060,824 B2
(45) Date of Patent: Nov. 15, 2011

(54) USER INTERFACE FOR A MULTIMEDIA SERVICE

(75) Inventors: Richard T. Brownrigg, Jr., Castle Rock, CO (US); Brian Scott Ellertson, Denver, CO (US); Jerad Harrison Harbaugh, Englewood, CO (US); Jodi Lynne Robinson, Denver, CO (US); Stephen Aric Ogden, Denver, CO (US); Rebecca Rusk Lim, Englewood, CO (US)

(73) Assignee: Starz Entertainment LLC, Englewood, CO (US)

( * ) Notice: Subject to any disclaimer, the term of this patent is extended or adjusted under 35 U.S.C. 154(b) by 854 days.

(21) Appl. No.: 11/969,571

(22) Filed: Jan. 4, 2008

(65) Prior Publication Data

US 2008/0168387 A1    Jul. 10, 2008

Related U.S. Application Data

(60) Provisional application No. 60/883,564, filed on Jan. 5, 2007, provisional application No. 60/883,560, filed on Jan. 5, 2007, provisional application No. 60/883,556, filed on Jan. 5, 2007.

(51) Int. Cl.
*G06F 3/00* (2006.01)
(52) U.S. Cl. ........................................ 715/716
(58) Field of Classification Search .............. None
See application file for complete search history.

(56) References Cited

U.S. PATENT DOCUMENTS

| | | | |
|---|---|---|---|
| 6,016,145 A * | 1/2000 | Horvitz et al. | 715/788 |
| 6,121,963 A * | 9/2000 | Ange | 715/202 |
| 6,948,131 B1 * | 9/2005 | Neven et al. | 715/753 |
| 2002/0113820 A1 * | 8/2002 | Robinson et al. | 345/764 |
| 2006/0064645 A1 * | 3/2006 | Neven et al. | 715/753 |
| 2006/0262032 A1 * | 11/2006 | DeLine | 345/1.1 |
| 2007/0162936 A1 * | 7/2007 | Stallings et al. | 725/58 |
| 2008/0034306 A1 * | 2/2008 | Ording | 715/764 |
| 2008/0155617 A1 * | 6/2008 | Angiolillo et al. | 725/93 |
| 2008/0222295 A1 * | 9/2008 | Robinson et al. | 709/227 |
| 2008/0276178 A1 * | 11/2008 | Fadell et al. | 715/733 |
| 2008/0276196 A1 * | 11/2008 | Tang | 715/800 |

* cited by examiner

*Primary Examiner* — Tuyetlien Tran
*Assistant Examiner* — Anil Bhargava
(74) *Attorney, Agent, or Firm* — Kilpatrick Townsend & Stockton LLP

(57) ABSTRACT

Methods, systems, and machine readable media are disclosed for providing a user interface for a service distributing multimedia content. According to one embodiment, providing a user interface accessing a media service can comprise generating a representation of a stage for presenting graphical elements related to multimedia content provided by the media service and displaying a first view of the stage, wherein the first view of the stage includes a portion of the stage less than all of the stage. The first view of the stage can comprise at least a first pane and a second pane, the first pane and the second pane including different portions of the stage. The first pane can include a first plurality of graphical elements representing content items available through the media service.

32 Claims, 37 Drawing Sheets

USER INTERFACE FOR A MULTIMEDIA SERVICE

CROSS-REFERENCES TO RELATED APPLICATIONS

This application claims the benefit of U.S. Provisional Application No. 60/883,564, filed Jan. 5, 2007, entitled USER INTERFACE SPOTLIGHT, U.S. Provisional Application No. 60/883,560, filed Jan. 5, 2007, entitled THREE-DIMENSIONAL MEDIA MENU, and U.S. Provisional Application No. 60/883,556, filed Jan. 5, 2007, entitled MOVING VIDEO WINDOW IN A MEDIA INTERFACE of which the complete disclosure of each is incorporated herein by reference for all purposes.

BACKGROUND OF THE INVENTION

Embodiments of the present invention relate generally to distribution of multimedia content and more particularly to a user interface for a multimedia service.

Interfaces for providing and/or accessing multimedia content follow a typical paradigm that is similar to that used by web pages. That is, these interfaces allow a user to navigate from one part of the interface to another or between content items as a series of pages. These pages are typically overlaid, one on top of the other. To navigate back to a previous element of content item, a back button may be used to step back though the previous pages in order. However, by overlaying these pages, one on top of the other, the previous pages, i.e., other possible content items and elements of the previously presented page or interface display, are obscured making access to these elements or items more difficult. Hence, there is a need in the art for improved methods and systems for providing a user interface for a service distributing multimedia content.

BRIEF SUMMARY OF THE INVENTION

Methods, systems, and machine readable media are disclosed for providing a user interface for a service distributing multimedia content. According to one embodiment, a method of providing a user interface for a client application, the client application for providing access to a media service, can comprise generating a representation of a stage for presenting graphical elements related to multimedia content provided by the media service and displaying a first view of the stage, wherein the first view of the stage includes a portion of the stage less than all of the stage. The first view of the stage can comprise at least a first pane and a second pane, the first pane and the second pane including different portions of the stage. The first pane can include a first plurality of graphical elements representing content items available through the media service. In response to a user selection of one of the first plurality of graphical elements, the selected graphical element can be displayed with a fly out effect within the first pane.

The method can also comprise displaying a first navigation element in the second pane, the first navigation element indicating a direction to additional portions of the stage. In response to a user selection of the first navigation element, the first pane can be replaced with a second navigation element indicating a direction of additional portions of the stage, the second pane can be moved to a previous location of the first pane, and a third pane can be displayed, the third pane including a portion of the stage represented by the first navigation element. The third pane can include a second plurality of graphical elements representing content items cached by the client application. In response to a user selection of one of the second plurality of graphical elements, he selected element can be displayed with a fly out effect in the third pane.

The method can also comprise displaying a spotlight element in a background of the user interface, the spotlight element indicting a current focus for the user interface. Indicating the current focus can comprise indicating a pane containing an element having focus. Indicating the current focus comprises moving the spotlight element to the pane having focus. The spotlight element can be changed in response to a user action. Changing the spotlight element can comprise temporarily increasing a brightness of the spotlight element. For example, the user action can comprise selecting an element of the user interface.

In some cases, a pane of the interface, such as the second pane, can include a video preview window. In such a case, moving the second pane to a previous location of the first pane can comprise sliding the video preview window from a first location to a second location while content is playing in the preview window.

According to another embodiment, a machine-readable medium can have stored thereon a series of instructions which, when executed by a processor, cause the processor to provide a user interface for accessing a media service by generating a representation of a stage for presenting graphical elements related to multimedia content provided by the media service and displaying a first view of the stage, wherein the first view of the stage includes a portion of the stage less than all of the stage. The first view of the stage can comprise at least a first pane and a second pane, the first pane and the second pane including different portions of the stage. The first pane can include a first plurality of graphical elements representing content items available through the media service. In response to a user selection of one of the first plurality of graphical elements, the selected graphical element can be displayed with a fly out effect within the first pane.

A first navigation element can be displayed in the second pane, the first navigation element indicating a direction to additional portions of the stage. In response to a user selection of the first navigation element, the first pane can be replaced with a second navigation element indicating a direction of additional portions of the stage, the second pane can be moved to a previous location of the first pane, and a third pane can be displayed, the third pane including a portion of the stage represented by the first navigation element. The third pane can include a second plurality of graphical elements representing content items cached by the client application. In response to a user selection of one of the second plurality of graphical elements, he selected element can be displayed with a fly out effect in the third pane.

A spotlight element can be displayed in a background of the user interface, the spotlight element indicting a current focus for the user interface. Indicating the current focus can comprise indicating a pane containing an element having focus. Indicating the current focus comprises moving the spotlight element to the pane having focus. The spotlight element can be changed in response to a user action. Changing the spotlight element can comprise temporarily increasing a brightness of the spotlight element. For example, the user action can comprise selecting an element of the user interface.

In some cases, a pane of the interface, such as the second pane, can include a video preview window. In such a case, moving the second pane to a previous location of the first pane can comprise sliding the video preview window from a first location to a second location while content is playing in the preview window.

DETAILED DESCRIPTION OF THE INVENTION

Figure 1:
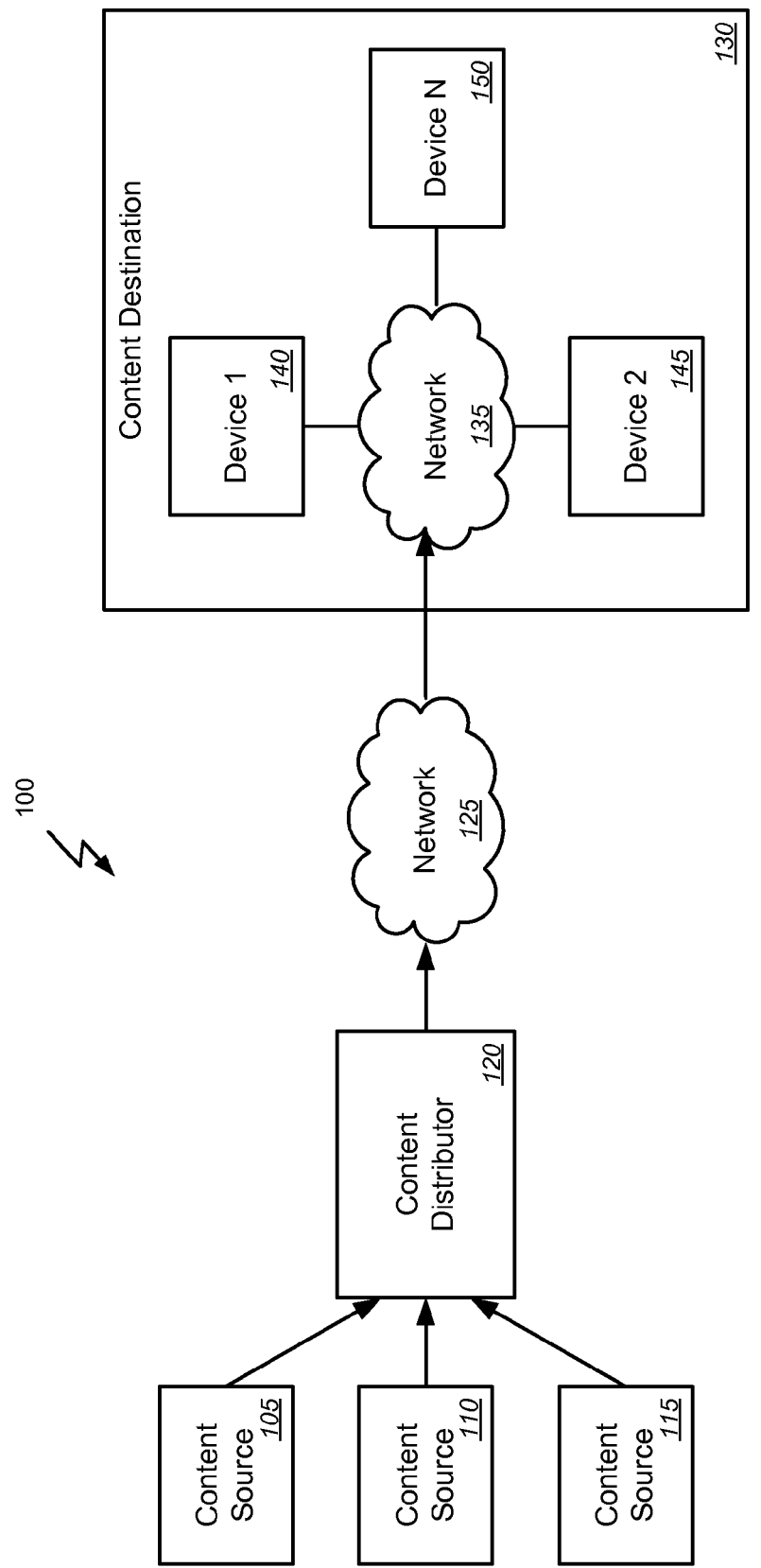
FIG. 1 is a block diagram illustrating an exemplary environment in which embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structure s, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/ or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Generally speaking, embodiments of the invention are directed to methods and systems for providing a user interface for navigating and consuming various types of multimedia content. For example, embodiments of the present invention may be useful for a provider of audio, video, and/or other multimedia content to a number of users and/or subscribers and for the subscribers to access, navigate, download, consume, and/or manage such content. Such multimedia content can include, for example, movies, television programs, music, games, or other content. In some cases, such content can be distributed to one or more users via the Internet or other communications network.

According to one embodiment, a client application can be distributed to users of a service offered by the content distributor. The client application can be executed by the user on a personal computer, media center extender, game console, or other processing device to allow the user to download and or view content offered by the content provider as part of the service. Additionally, the client application can provide a user interface such as discussed in detail below to facilitate navigation, selection, consumption, management, etc. of the content and the interactions with the service.

FIG. 1 is a block diagram illustrating an exemplary environment in which embodiments of the present invention may be implemented. In this example, the system 100 includes a number of content sources 105-115 that can supply multimedia content to content distributor 120. For example, the content sources 105-115 can provide movies, television programs, audio programs, etc. to the content distributor 120. This content can be communicated to the content distributor 120 by any of a number of communication media including but not limited to satellite transmissions, the Internet or other communications network, over-the-air transmission, etc.

Generally speaking, the content distributor 120 can store the multi-media content provided by the content sources 105-115 and redistribute the content to a number of content destinations 130. A content destination 130 can comprise, for example, a home, office, or other facility of one or more subscribers or users. The content distributor 120 can distribute the content to the content destination 130 via any of a variety of channels including but not limited to satellite transmissions, the Internet or other communication network 125, a cable television system, over-the-air transmissions, etc.

The content destination 130 can include any number of devices 140-150 for accessing and/or consuming, i.e., playing, displaying, storing, etc., the content provided by the content distributor 120. In some cases, the content destination 130 can include a network 135 such as a wired or wireless local area network. In such cases, one or more of the devices 140-150 of the content destination 130 can comprise a media server adapted to store and/or redistribute, i.e., play out, the content to other devices of the content destination 130 as known in the art. Additionally or alternatively, the devices 140-150 can include any number and/or types of devices including but not limited to a personal computer, media center extender, game console, or other processing device to allow the user to download and or view content offered by the content distributor 120 as part of the service.

As will be described in detail below, a client application can be distributed to users of a service offered by the content distributor 120. The client application can be executed on any one or more of the devices 140-150 of the content destinations 130. That is, the client application can be executed by the user on a personal computer, media center extender, game console, or other processing device 140-150 to allow the user to download and or view content offered by the content distributor 120 as part of the service. Additionally, the client application can provide a user interface such as discussed in detail below to facilitate navigation, selection, consumption, management, etc. of the content and the interactions with the service.

According to one embodiment, while the client application can be resident and executed on one device, the user interface described herein may be rendered on another. For example, in a residence or other content destination 130 in which a network 135 is installed and operating, the client application may reside on and be executed by one device 140, e.g., a computer such as a media server. Other devices 145 and 150 on the network 135, such as media extenders, game consoles, etc. may receive from the media server markup language files describing the interface, the elements displayed thereon, actions to be taken, etc. In this way the interface can be rendered remotely and the client application can appear to be operating on different devices 145 and 150 on the network 135. The markup language used for rendering the interface remotely can comprise any of a variety of markup languages such as, for example, eXtensible Markup Language (XML) or another standard or proprietary language. Additionally, the elements and commands exchanged for rendering the interface, as understood by one skilled in the art, can vary between implementations without departing from the scope of the present invention.

Figure 2:
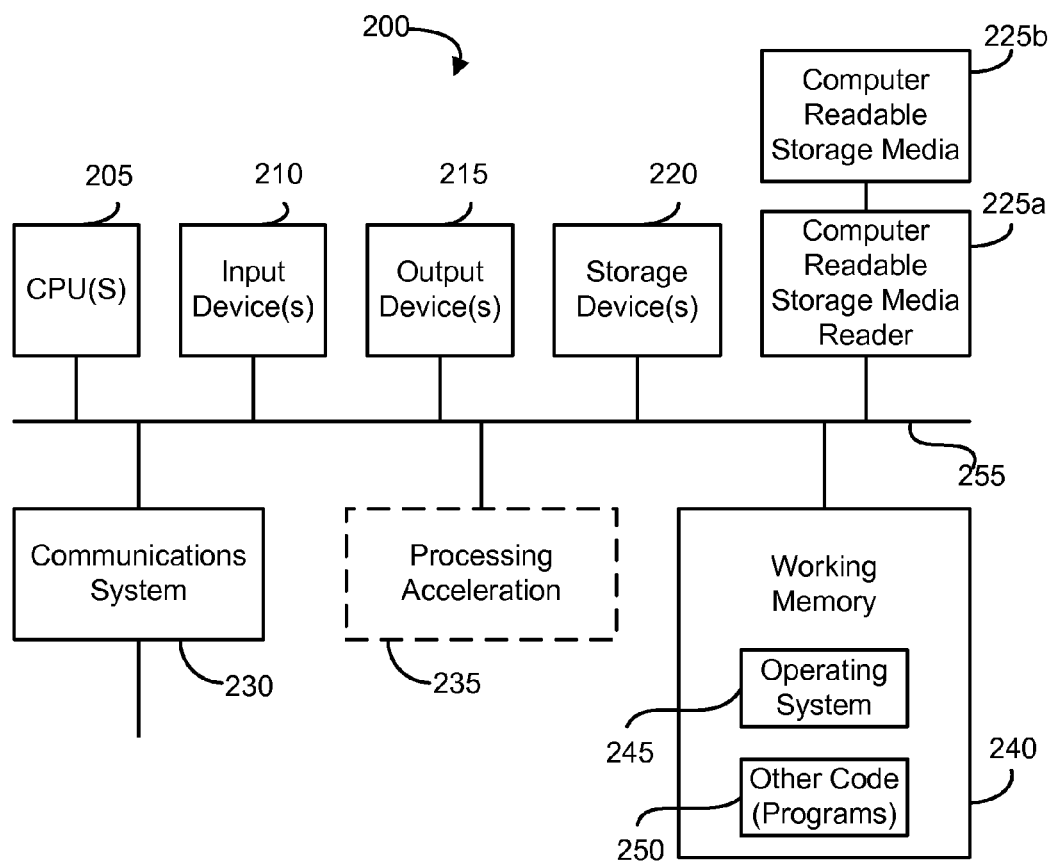
FIG. 2 is a block diagram illustrating an exemplary computer system upon which embodiments of the present invention may be implemented.

FIG. 2 is a block diagram illustrating components of an exemplary computer system upon which embodiments of the present invention may be implemented. For example, the system 200 illustrated here is thought to be adaptable for implementation of some or all of the content distributor system 105, devices 140-150, or other elements of the systems described above. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Software residing and/or executing on a system such as described above can include a client application for a content distribution service. As noted above, a client application can be distributed to users of a service offered by a content provider. The client application can be executed by the user on a personal computer, media center extender, game console, or other processing device to allow the user to download and/or view content offered by the content provider as part of the service. Additionally, the client application can provide a user interface such as discussed in detail below to facilitate navigation, selection, consumption, management, etc. of the content and the interactions with the service.

Figure 3:
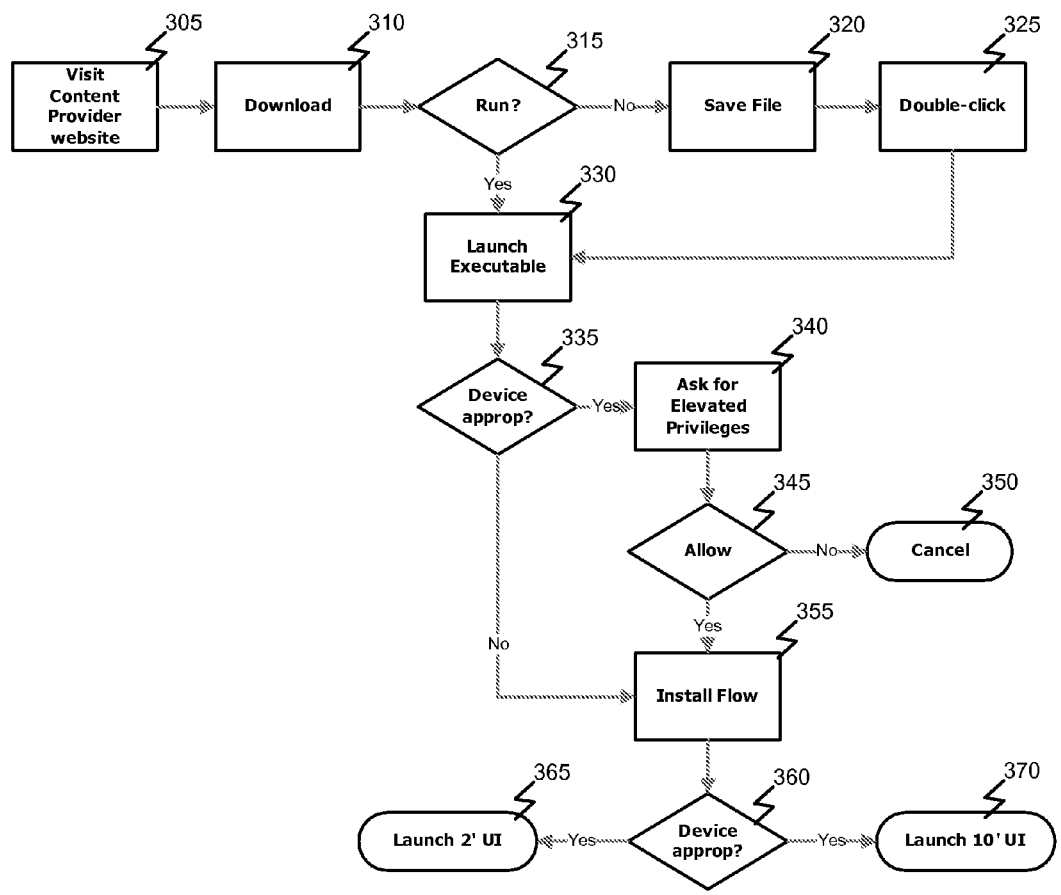
FIG. 3 is a flowchart illustrating a process for downloading and/or installing a client application for presenting a user interface according to one embodiment of the present invention.

FIG. 3 is a flowchart illustrating a process for downloading and/or installing a client application for presenting a user interface according to one embodiment of the present invention. More specifically, this example illustrates a process for downloading and installing a client application from, for example, a web site. Initially, the user can access 305 a location at which a package for installing the client application is available. For example, the user can visit a web site or service provided via the Internet or other communications network. The user can then download 310 the package for installing the client application and choose to either run the application immediately or not. That is a determination 315 can be made as to whether user wants to run the installation application at the time the download is completed. If 315 the user chooses to not run the application now, a file, such as the package for installing the client application, can be saved 320 on the user's device to allow the user to install and run the client application at a later time, for example by double clicking or otherwise selecting 325 the saved application.

If 315 the user chooses to run the application, for example, at the time the package for installing the client application is downloaded or later, by double clicking or selecting 325 the saved package, the executable can be launched 330 to install the client application. A determination 335 can be made as to the operating system or other software or hardware of the user's device. In some cases, depending upon the user's device and/or the software executing thereon, features of the client application may not be available. Additionally or alternatively, enhanced features of the client application and/or media service may be available for some operating systems etc. In such cases, and if 335 the user's device and/or software is appropriate, access to the client application and/or elevated privileges with regard to the media service and/or the content offered thereby can be requested 340 for the user.

A determination 345 can then be made as to whether to grant such privileges. In response to determining 345 to grant access, an install process 355 can be executed to complete installation of the client application. After installation, the application can be launched. According to one embodiment, prior to or as part of the launch process, a determination 360 can be made as to the operating system or other software installed on the client device. In some cases, depending upon the software of the user's device, the launch process 365 and 370 and/or the user interface initially presented may vary. For example, in one case, depending upon the operating system installed on the user's device, a user interface such as illustrated by FIGS. 6B and 6C may be presented as part of launching the client application. Such an interface can comprise, for example, a "2-foot interface" which can be adapted for manipulation by the user through an input device such as a mouse or keyboard. In other cases, the interface initially presented may be similar to that illustrated by 7-9. Such an interface can comprise, for example, a "10-foot interface" which can be adapted for manipulation by the user through an input device such as a TV remote control or similar device.

Figure 4:
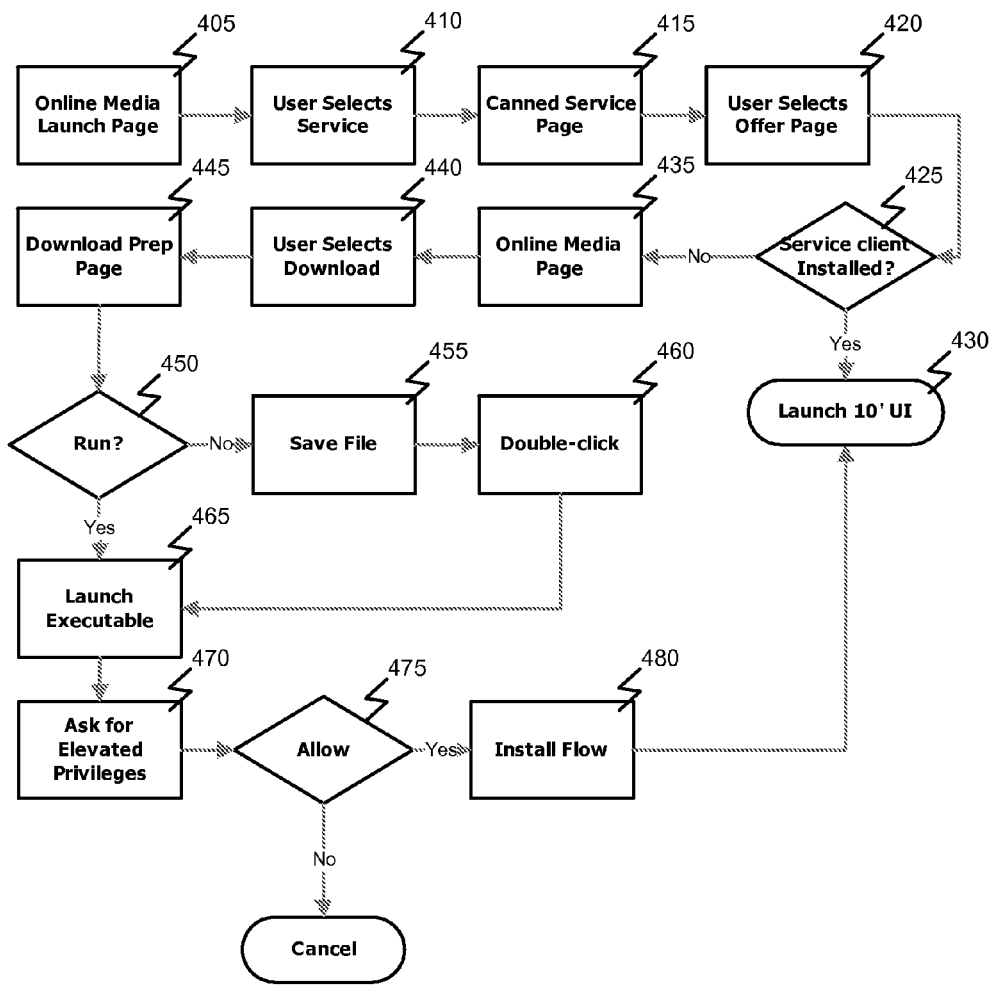
FIG. 4 is a flowchart illustrating a process for downloading and/or installing a client application for presenting a user interface according to one embodiment of the present invention.

FIG. 4 is a flowchart illustrating a process for downloading and/or installing online media according to one embodiment of the present invention. The process can be initiated by the user requesting or viewing 405 an online launch page such as a web page from the service provider's web site. Via the online launch page, the user can select 410 the service and, in response, be presented 415 with a canned welcome page. The welcome page can include an offer for the service that can include, for example, pricing information, terms and conditions, a service explanation, etc. Upon the user selecting 420 the offer or otherwise indicating agreement, a determination 425 can be made as to whether the client application has already been installed on the user's device. In response to determining 425 that the client application has already been installed on the user's device, the client application can be launched 430. Launching 430 the client application can comprise presenting a "ten-foot" user interface such as described below beginning with FIG. 7.

In response to determining 425 that the client application has not already been installed on the user's device, an online media page for the service can be presented 435. Via the online media page for the service, the user can select 440 a download for the client application. Upon the user selection, the user can be presented 445 with a download page which can include, for example, an option to initiate the download and/or installation. For example, a determination 450 can be made as to whether user wants to run the installation application at the time the download is completed. If 450 the user chooses to not run the application now, a file, such as the package for installing the client application, can be saved 455 on the user's device to allow the user to install and run the client application at a later time, for example by double clicking or otherwise selecting 460 the saved application.

If 450 the user chooses to run the application, for example, at the time the package for installing the client application is downloaded or later, by double clicking or selecting 460 the saved package, the executable can be launched 465 to install the client application. In some cases, depending upon the user's device and/or the software executing thereon, features of the client application may not be available. Additionally or alternatively, enhanced features of the client application and/or media service may be available for some operating systems etc. Therefore, access to the client application and/or elevated privileges with regard to the media service and/or the content offered thereby can be requested 470 for the user.

A determination 475 can then be made as to whether to grant such privileges. In response to determining 475 to grant access, an install process 480 can be executed to complete installation of the client application. Upon completion of installation of the client application, the client application can be launched 430. Launching 430 the client application can comprise presenting a "ten-foot" user interface such as described below beginning with FIG. 7.

Figure 5:
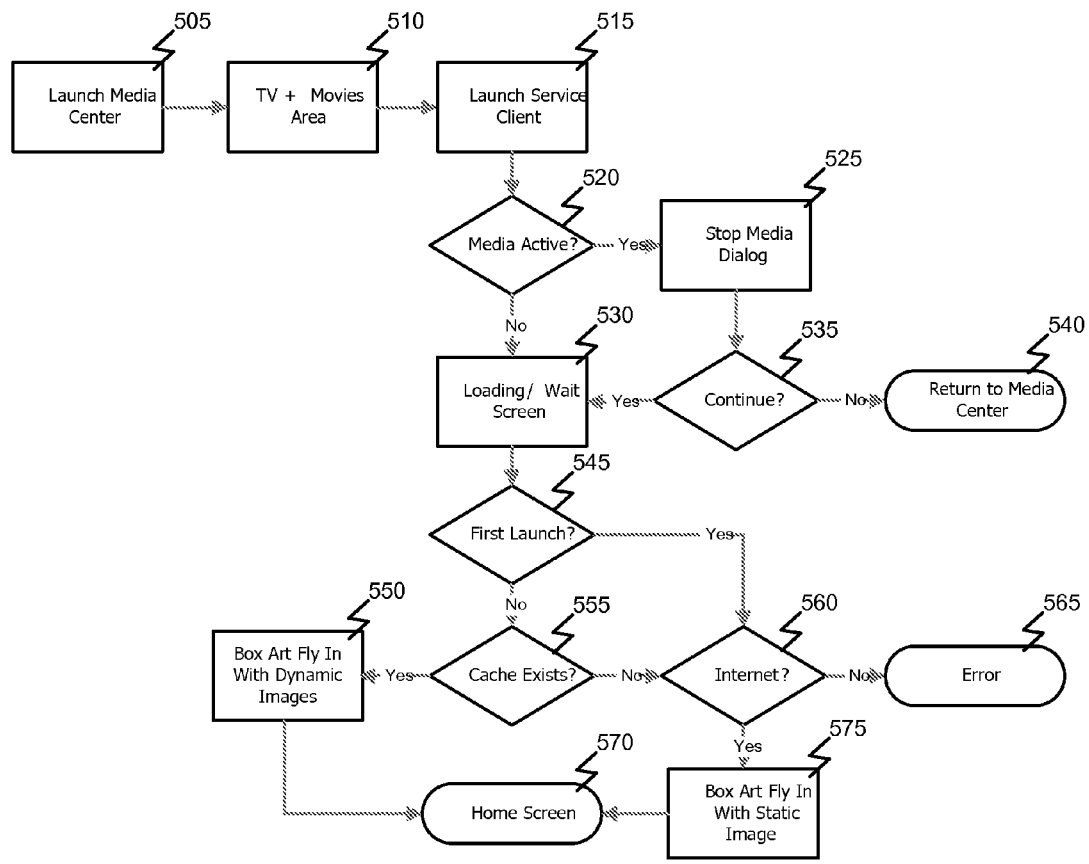
FIG. 5 is a flowchart illustrating a process for loading a client application for presenting a user interface according to one embodiment of the present invention.

FIG. 5 is a flowchart illustrating a process for loading a client application for presenting a user interface according to one embodiment of the present invention. More specifically, this example illustrates a process for installing the client application from within an application container or shell such as, for example, Microsoft Windows Media Center Edition (MCE). The process can be initiated by the user requesting or viewing a launch page view the user device. For example, the user may be presented with a series of interface pages, screens, displays, etc as illustrated by FIGS. 6A-6C.

Figure 6A:
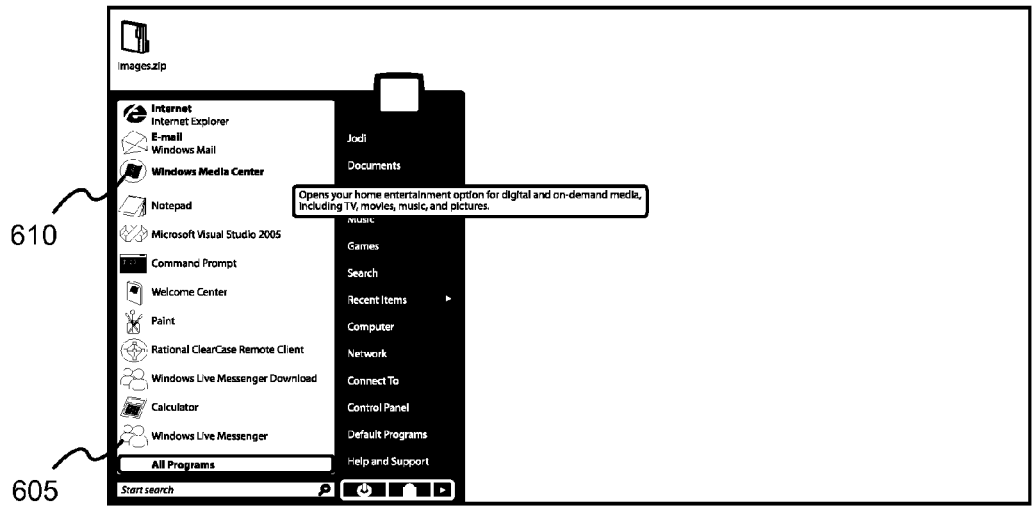
FIGS. 6A-6C illustrate loading a client application for presenting multimedia content according to one embodiment of the present invention.
Figure 6B:
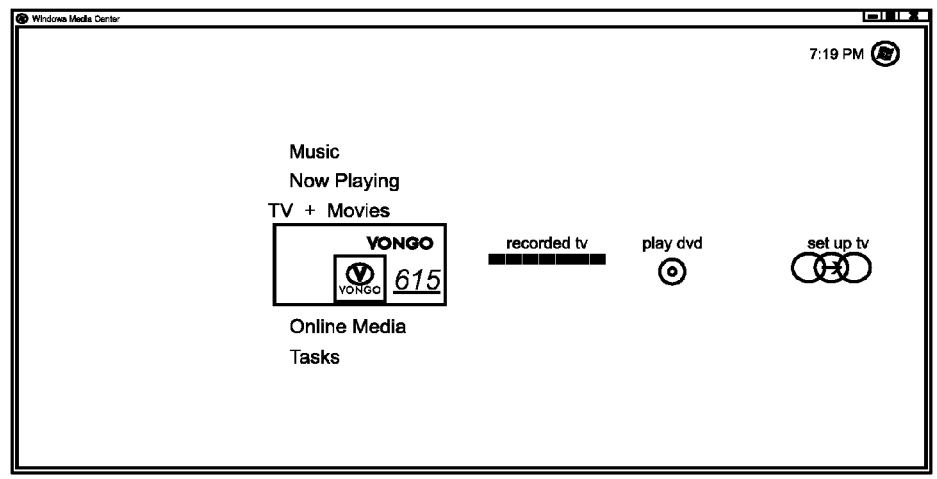
Figure 6C:
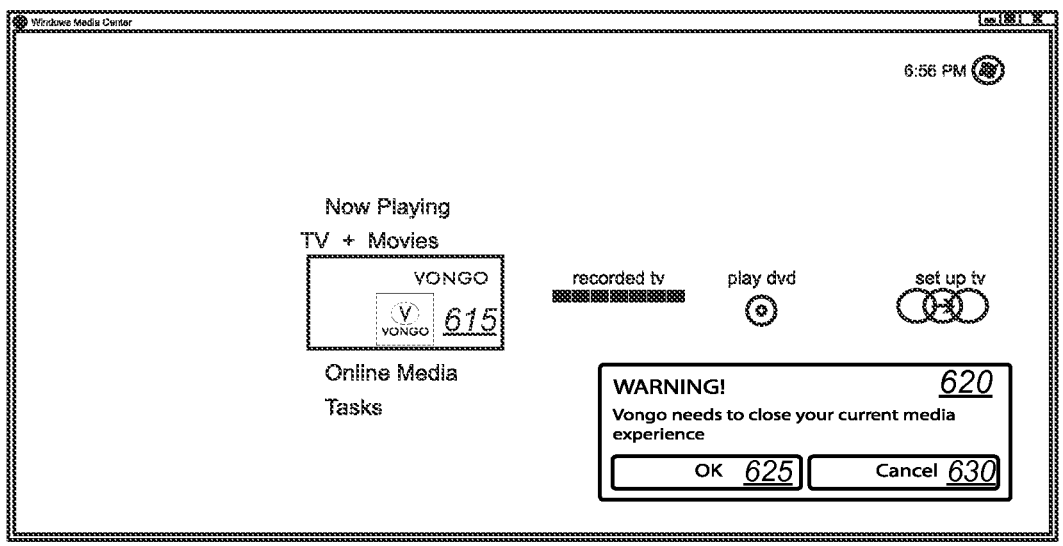

More specifically, the process can begin with the user launching 505 a shell such as MCE in a common manner, e.g., via the Windows Start menu as illustrated in FIG. 6A. Upon start of the shell, a menu such as illustrated in FIG. 6B may be presented 510 to the user. One of the options can be an option to launch the client application for the media service. Upon a user selection of such an option, the client application can be launched 515.

Figure 7A:
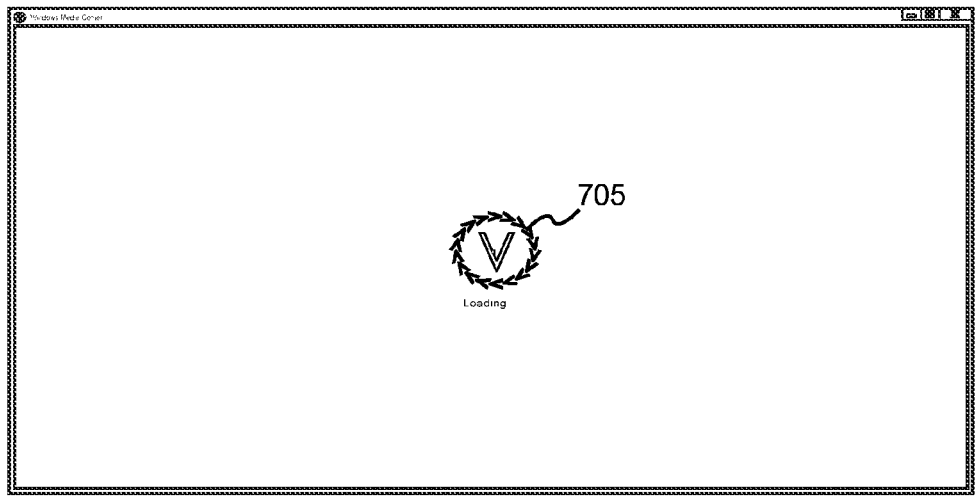
FIGS. 7A-7C illustrate a client application start-up or introduction sequence according to one embodiment of the present invention.

A determination can be made 520 as to whether any other media is currently active, i.e., playing. In response to determining 520 other media is active, a stop media dialog such as illustrated in FIG. 6C can be presented 525. A determination 535 can be made as to whether the user selects or otherwise indicates the other media should be stopped, i.e., whether the client application of the media service should be allowed to continue. In response to determining 535 that the user indicates the other media should not be stopped, processing can return 540 to the shell, e.g., Windows MCE. In response to determining 535 that the user indicates the other media should be stopped, i.e., the client application of the media service should be allowed to continue, a load or wait screen such as illustrated in FIG. 7A can be displayed.

Figure 9:
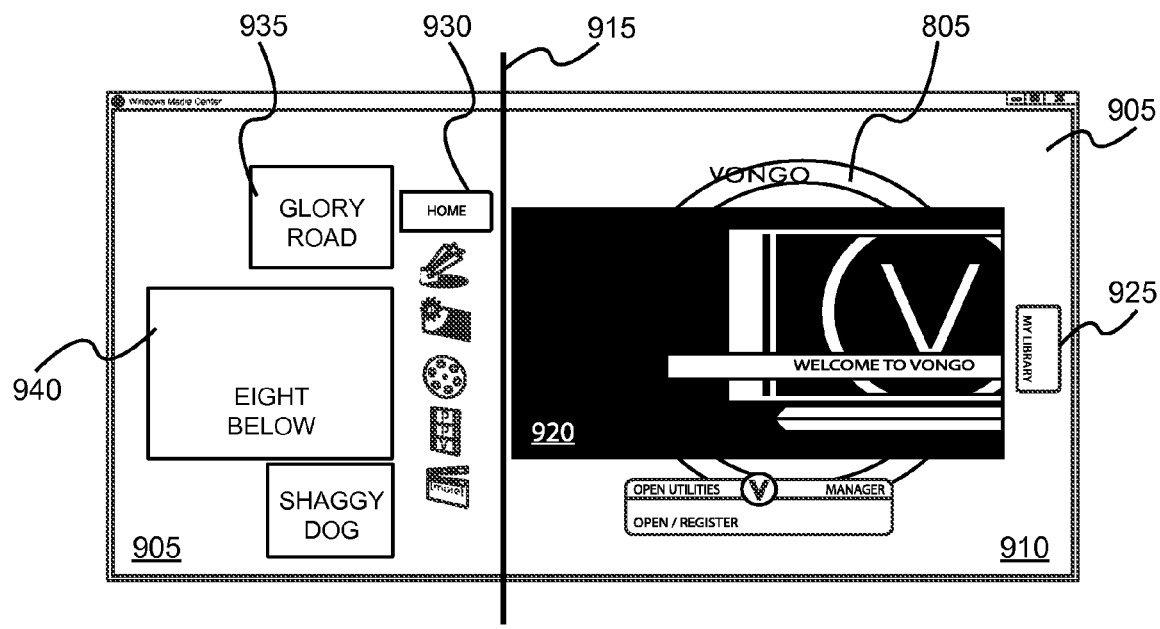
FIG. 9 illustrates a view of a user interface according to one embodiment of the present invention.

According to one embodiment, a determination 545 can be made as to whether this is an initial or first launch of the client application. If 545 this is the first launch, access to the Internet or other communication network can be checked 560. If 560 access is not available, an error may be displayed 565. If 560 access is available, a set of graphics can be downloaded for display 575 on a page or screen as described below with reference to FIG. 7B. Generally speaking, this set of graphics can be displayed 575 in a manner to move the graphics along a Z-axis of the display page to give a "fly in" visual effect. In other words, the set of graphics can be displayed and/or animated in a manner to give the visual impression of the graphics moving away from the user from the user's perspective. This set of graphics can, according to one embodiment, be dynamic. That is, the set of graphics downloaded can change based on any of a number of criteria but can include, for example, a current set of features or content selected by the media service for promotion, etc. At the end of such animation, a home screen such as illustrated by FIG. 9 can be displayed 570.

According to one embodiment, if 545 this is not the first launch of the client application, a determination 55 can be made as to whether a set of opening graphics was previously cached. For example, a set of graphics previously downloaded may be cached for use. Thus, a set of previously cached graphics, perhaps related to the user's previously viewed content, can be used. Again, this set of cached or dynamic graphics can be displayed 550 on a page or screen as described below with reference to FIG. 7B and in a manner to move the graphics along a Z-axis of the display page to give a "fly in" visual effect. A home screen such as illustrated in FIG. 9 can then be displayed to allow the user to navigate, view, manage, etc content available through he media service.

FIGS. 6A-6C illustrate launching a client application for presenting multimedia content according to one embodiment of the present invention. In the example illustrated in FIG. 6A, the user can initiate the client application via a start menu 605 such as provided by Microsoft Windows or another operating system. In some cases, as illustrated in FIG. 6A, launching the client application of the media service can comprise first launching a shell such as Windows Media Center by selecting an option 610 for that shell from the start menu 605. In the case that the user is executing Windows Media Center Edition, an additional set of displays may be presented as illustrated by FIGS. 6B and 6C. For example, FIG. 6B illustrates a display through which the user can select an element 615 for launching the client application for accessing the media service as one of the media selections. Upon such a selection, the user may be presented with a notice or warning as illustrated by the dialog box 620 in FIG. 6C to inform the user that the client application is being launched and that it will override and/or "close" the current media, if any. The dialog box 620 can include, for example, one or more buttons 625 and 630 for permitting or rejecting close of the current media.

Figure 7B:
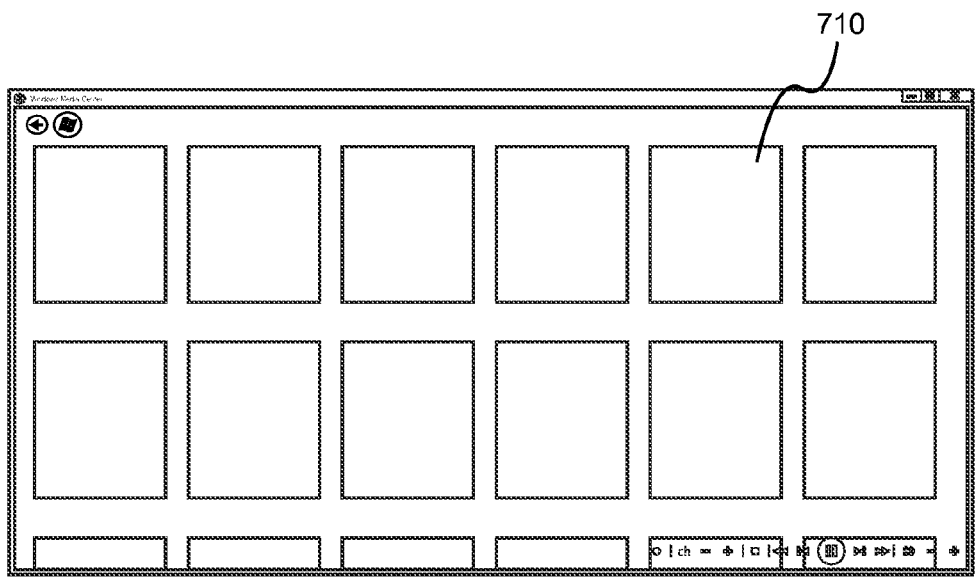
Figure 7C:
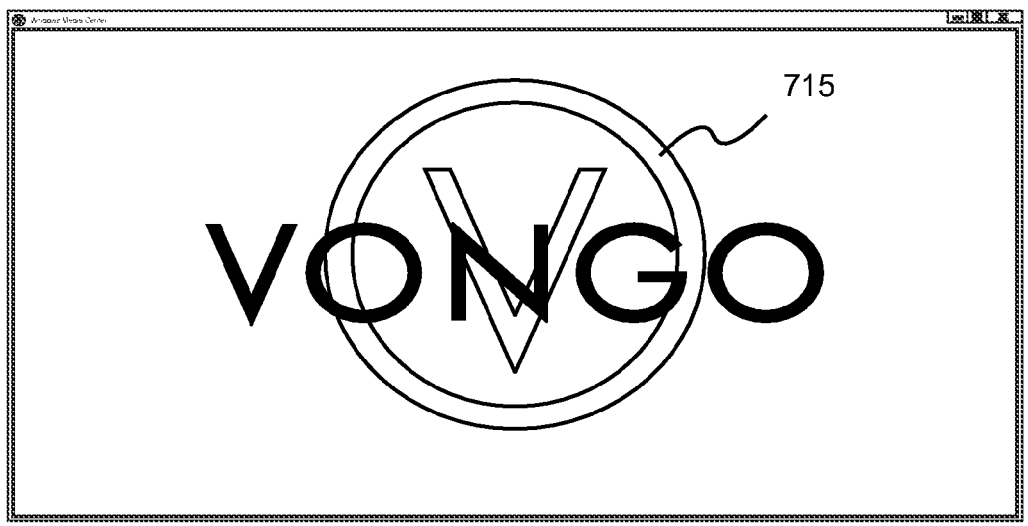

FIGS. 7A-7C illustrate a client application start-up or introduction sequence according to one embodiment of the present invention. These examples illustrate an initial display presented by the client application. Initially, as illustrated in FIG. 7A a "loading" message 705 may be displayed while the client application starts and loads initial data such as cached, dynamic graphics or static graphics 710 for the opening sequence as discussed above.

The static or dynamic graphics 710 can be presented in FIG. 7B as a grid of "box art" or other images representing, for example, content provided by the media service. As noted above, this grid of graphics 710 can be displayed in a manner to move the graphics along a Z-axis of the display page to give a "fly in" visual effect. That is, as the graphics move along the Z-axis in a direction away from the user, the graphics become progressively smaller giving the impression or illusion that the graphics are moving away from the user in a three-dimensional space.

According to one embodiment, once the grid of graphics 710 have move sufficiently "far away" from the user, the grid may be replaced with a logo or other graphic 715 as illustrated in FIG. 7C. Such a graphic 715 can be displayed, for example, for a predetermined amount of time, until the client application finishes any start-up procedures, until a user input is detected, etc. A main or home page of the user interface such as illustrated in FIG. 9 can then be displayed.

Generally speaking, the interface can provide a number of different elements arranged to provide for navigating, discovering, and accessing the content provided by the service. For example, according to one embodiment the interface can include a spotlight element in a background of the user interface. The spotlight element can indicate a current focus for the user interface. That is, as will be described in detail below, the spotlight element can move across the interface as the user navigates or interacts with the interface in a manner that the location of the spotlight element in a background of the interface indicates an element of the foreground of the interface that currently has focus, i.e., is currently interacting with the user.

The interface can also include a representation of a stage for presenting various elements related to multimedia content provided by the media service. As will be described in detail below, the stage can extend beyond that areas that currently viewed or displayed. That is, the stage can be larger than the view thereof that is displayed. Furthermore, the stage can comprise a number of panes, for example, a first pane and a second pane. The first pane and the second pane can include different portions of the stage. One of the panes can include a first set of elements representing content items available through the media service. In response to a user selection of one of the elements, the selected element can be displayed or animated in a manner that causes the selected element to appear to move in a direction toward the user. Furthermore, additional details of the selected item may be presented in or on the element. That is, in response to the user selection, the selected content element can be highlighted and/or displayed in a manner to give an appearance of the item moving toward the user while providing additional details of the selected item but within the original pane or portion of the stage in which the selected item was displayed. Thus, the user interface provides for additional content information or discovery while allowing the user to see other portions of the interface, i.e., other pane of the stage for navigation purposes. Therefore, even though additional details of the selected item are provided, navigation to other portions of the interface are not obscured.

The user can navigate to other portions of the interface, i.e., other portions of the stage, by selecting a navigation element. For example, an element can be presented for moving right or left to a portion of the stage not currently displayed. In response to a user selection of the such a navigation element, the view of the stage can be displayed and/or animated in a manner to give the appearance of the stage or view of the stage sifting in the indicated direction. It should be noted that, while described here as moving left or right across the interface or stage from the user's perspective, the interface is not limited to navigation in only the horizontal direction, i.e., along the X-axis. Rather, navigation can also be performed in the vertical direction from the user's perspective, i.e., along the Y-axis. Furthermore, while navigation can occur in either the horizontal or vertical direction from the user's perspective, i.e., along the X-axis or the Y-axis, the third dimension, i.e., the Z-axis, which provides for displaying objects or elements in a manner that gives that appears of the element moving toward the user from the user's perspective, can be reserved for presenting additional details of the selected element. Furthermore, this content discovery or additional details can be presented in a manner that does not obscure other portions of the interface for navigation purpose.

Also as will be described in greater detail below, the interface can include a video display or preview window in which a selected content item may be played or previewed. This window can be displayed on a portion of the stage, i.e., in one pane of the stage. As the user navigates across the stage and the view of the stage shifts, the video preview window can be moved with the pane in which it is being displayed in a manner that causes the video preview window to smoothly slide across the stage with its pane while the video continues to play within the window. That is, moving the pane of the stage to affect navigation can comprise sliding the video preview window from a first location to a second location while content is playing in the preview window. Additional details of the video preview window as well as the spotlight element, stage, and other elements of the user interface will be described below with reference to the figures.

Figure 8:
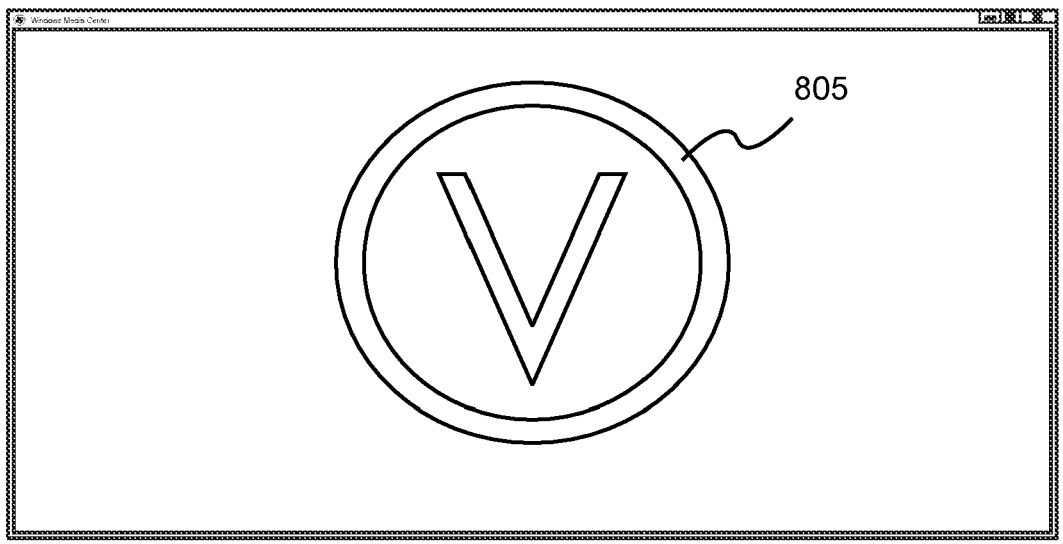
FIG. 8 illustrates a background of a user interface of a client application according to one embodiment of the present invention.

FIG. 8 illustrates a background of a user interface of a client application according to one embodiment of the present invention. This example illustrates a "spotlight" element 805 of the background of the user interface according to one embodiment. It should be noted that the spotlight 805, while illustrated here as similar to the logo illustrated in FIG. 7C, such a graphic is not required. Rather, the spotlight 805 can comprise any graphic or visual effect that can draw the user's attention. That is, according to one embodiment, the spotlight 805 can be used to highlight or indicate a portion of the user interface that current is active or has focus as the user navigates through or around the user interface. As such, the spotlight 805 moves across or around the background of the interface as the user navigates the interface. Furthermore, the spotlight 805 may provide other effects as the user interacts with the interface. For example, the spotlight 805 may flash or momentarily change color when the user clicks, selects, or otherwise manipulates an element of the interface.

FIG. 9 illustrates a view of a user interface according to one embodiment of the present invention. First, it should be noted that the background of the interface includes the spotlight 805 illustrated in FIG. 8. However, in this example, the spotlight 805 has been shifted to the right of center of the display to indicate a portion of the interface currently having focus.

Generally speaking, the interface comprises a view 901 of a "stage." The stage can comprise, conceptually, a representation of a theatrical stage upon which elements of the interface are presented and across which the user can navigate via the elements of the interface. The view 901 can comprise a window in which the stage is displayed, as represented here, or can comprise, for example, a full screen display. It will be apparent and should be understood that the stage can be larger than the view 901 thereof presented. The stage can be larger than the view 901 in one or both of the horizontal (X-axis) and vertical (Y-axis) directions. As will be seen, the view 901 can then shift back and forth and/or up and down the stage as the user navigates the interface.

Additionally, the view 901 can be divided into a number of "panes" 905 and 910 as represented here by the imaginary line 915. For example, as illustrated in FIG. 9, the interface can include a right pane 910 and a left pane 905. While not delineated by any visible indication, the right pane 910 of this example includes a preview window 920 or box which, in this example, is displaying a welcome message. At other times, the preview window 920 can play or display previews or other content selected by the user and/or provided by the media service. It should also be noted that, as mentioned above, the spotlight 805 is displayed "behind" the preview window 920 indicating that the current right pane, i.e., the center portion of the stage, currently has focus.

Also included in the right pane 910 can be a tab or other graphic indication 925. In this example, the indication 925 is labeled "My Library" representing a user's library of content selections. As will be seen, this tab, as illustrated here, indicates that additional portions of the interface are available. That is, the tab represents that the stage extends to the right beyond the current view 901. As will be seen, the user can select this indication 925 to move the view 901 to the right on the stage and thereby expand the portion of the view 901 represented by the indication 925. Consequently, the opposite, i.e., left side of the stage can be compressed and replaced by a similar tab or other indication as will be seen.

In the example of FIG. 9, the left pane 905 of the view 901 includes a set of icons 930 representing options or tools available through the interface. As will be seen, the icons 930 can be replaced with a textual or other indication to represent a currently selected icon. For example, in FIG. 9, the "Home" icon is replaced with a highlighted, textual "HOME" indication to denote the current display of the "Home" or main page or display of the user interface. Other possible options represented by the icons 930 will be discussed below.

The left pane 905 can also include a carousel 935 of graphics that, according to one embodiment, are related to content available through the media service. For example, the graphics of the carousel 935 can represent movies or other content. Items can be placed on the carousel 935 as they become available, i.e., "new features", when they are offered at special rates or pricing, based on a user's interests or preferences, or based on other criteria. Furthermore, according to one embodiment, the carousel 935 can comprise a greater number of items that are currently displayed. That is, the carousel 935 can extend beyond the current view 901 of the stage. Thus, the user can scroll "up" or "down" or "rotate" through the carousel items. As the user scrolls or rotates, the items of the carousel 935 can be made to shift up and down and to be added to and removed from the pane 905, thus giving the impression of the carousel rotating. Furthermore, according to one embodiment, one of the items, in this case the middle item 940, can be made larger, i.e., moved toward the user along the Z-axis of the interface to indicate current focus on that item.

Additional details of the user interface and functions provided thereby will be described below. Additional examples of the interface's appearance during various operations and as the user navigates will also be described.

Figure 10:
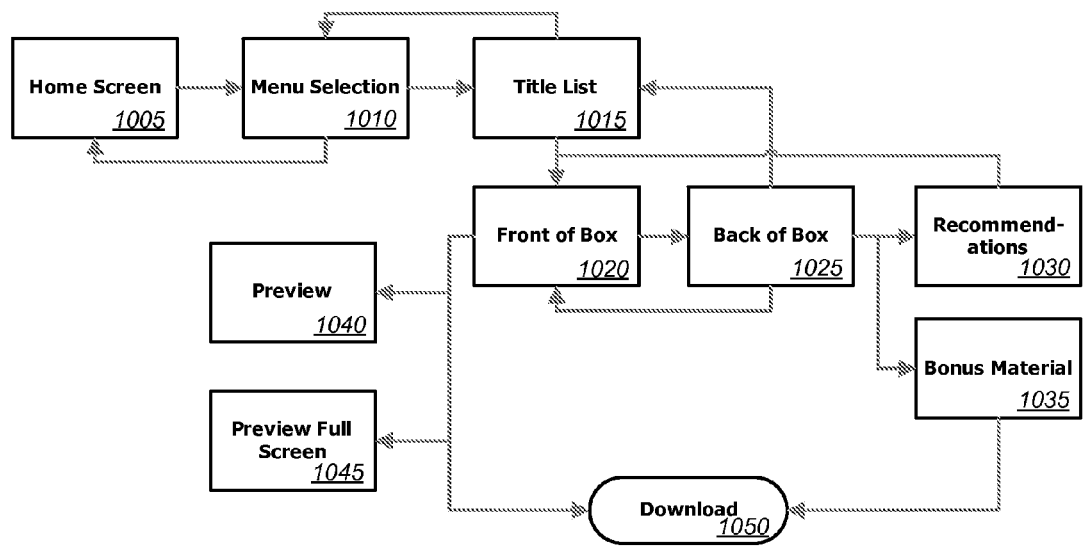
FIG. 10 is a flowchart illustrating a process for browsing multimedia content via the user interface according to one embodiment of the present invention.

FIG. 10 is a flowchart illustrating a process for browsing multimedia content via the user interface according to one embodiment of the present invention. Generally speaking, navigation of the interface can begin with display 1005 of the home or main screen or display, i.e., a view of the stage, such as illustrated in FIG. 9 and described above. From the home screen, the user can make a menu selection 1010, for example from the list of icons 930 described above. The selection can include, for example, an option to view a list of titles of content available such as "Top Picks" (see FIG. 12C) or genre specific titles such as "Kids & Family" (see FIG. 12D). Upon a user selection of one of these categories, a list of titles can be displayed 1015. More specifically, the list of titles can comprise a grid or matrix or other representation of a set of graphics representing available content such as illustrated, for example, by FIGS. 12C and 12D.

From the list of titles, e.g., from the graphics representing available content, the user can make further selections. For example, the user can select one of the titles by clicking on the graphic representing that title. In response, an addition view of the selected item can be displayed 1020. For example, this additional view can comprise a "Front of Box," view i.e., additional graphics or information such as normally printed on the front of a DVD box and possibly other information and options such illustrated, for example, by FIG. 12F. As will be discussed below, presenting or displaying 1020 the Front of Box view can include an animation or effect including a "fly out" effect that displays the graphic in a manner that gives the visual impressing of the selected graphic moving out of the stage toward the user, i.e., moving along the Z-axis in a direction toward the user from the user's perspective. Furthermore, and as will be described below with reference to the figures, this view can be displayed over the pane displaying the title list but without obscuring other portions of the current view of the stage allowing the user to access those portions of the view to navigate the stage.

From the Front of Box view, the user may select a different view of the selected content item, for example to obtain additional information about the selected content item. As a result of this selections, an addition view of the selected item can be displayed 1025. For example, this additional view can comprise a "Back of Box," view i.e., additional graphics or information such as normally printed on the back of a DVD box and possibly other information and options such illustrated, for example, by FIG. 12G. Presenting or displaying 1025 the Back of Box view can include an animation or effect including a "flip" effect that displays the graphic in a manner that gives the visual impressing of the selected graphic flipping or turning over, i.e., like the user is turning over a DVD box.

Additionally or alternatively, from the Front of Box view, the user may select one or more options presented thereby. For example, the user may select a preview option. As a result, a preview of the selected content item can be displayed 1040 in a preview window 925 such as illustrated by FIG. 12F. Additionally or alternatively, a full screen preview option can be selected causing the preview of the selected content item to be displayed 1045 in a full-screen mode rather than in the preview window 925.

From the Back of Box view, the user may select one or more option presented thereby. For example, the user may select a recommendations option for receiving recommendation of other content items that may be of interest to the user based on the currently selected content item. In response to such a selection, recommendations can be displayed 1030 such as illustrated, for example, in FIGS. 12G and 12H. Additionally or alternatively, a bonus materials option can be selected by the user. In response to such a selection, additional or bonus material related to the selected content item can be displayed 1035.

Furthermore, from one or more of the displays such as the Front of Box display, the Back of Box display, the Bonus Material display or others, the user can select an option to download and/or view the selected content item. In response to the user selecting such an option, the selected content item can be downloaded 1050 for display and/or to be saved for later viewing.

Figure 11:
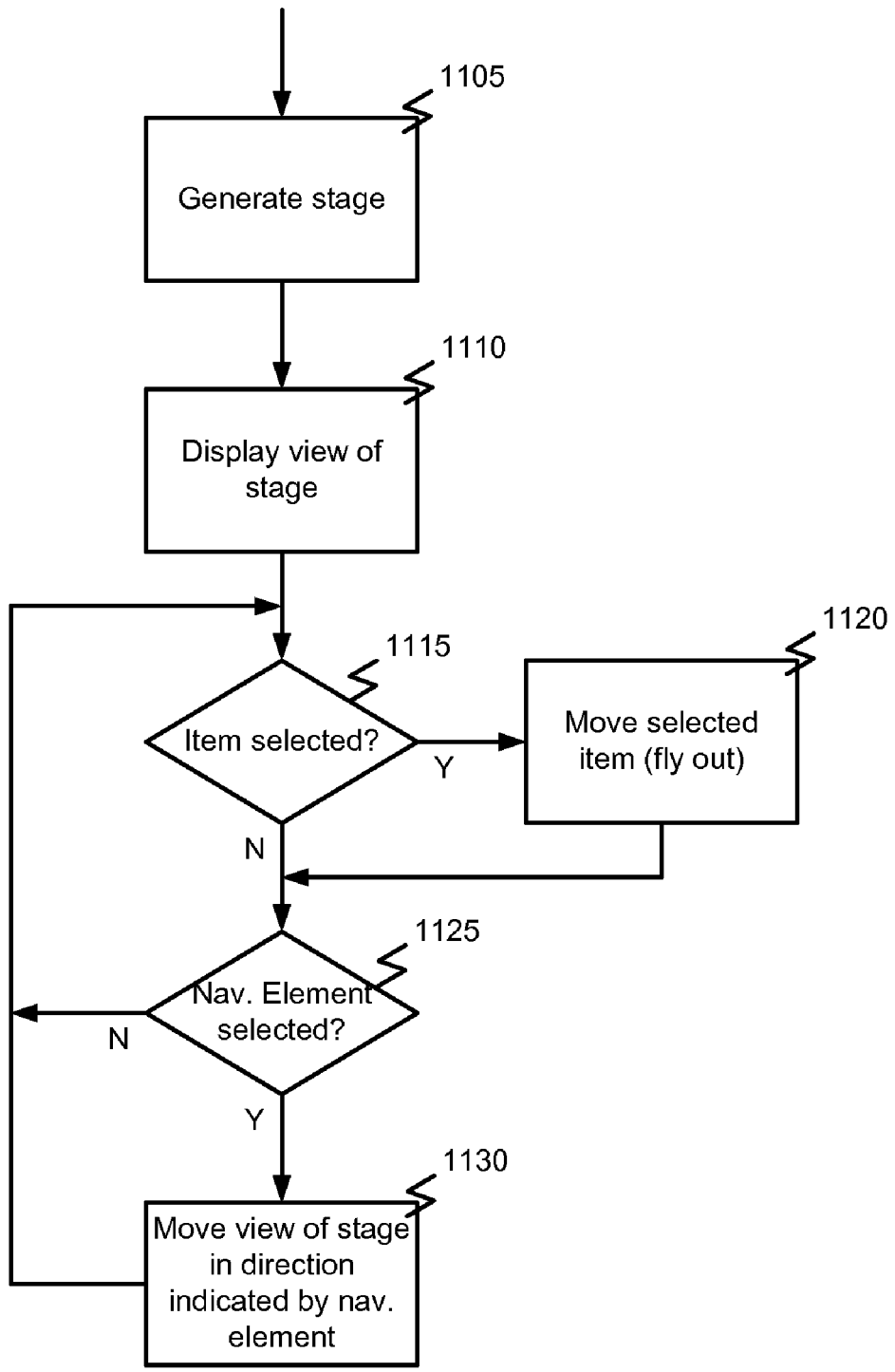
FIG. 11 is a flowchart illustrating addition details of presenting and navigating a user interface according to one embodiment of the present invention.

FIG. 11 is a flowchart illustrating addition details of presenting and navigating a user interface according to one embodiment of the present invention. This process illustrates an exemplary process for moving or navigating through a stage as described above and may be used in conjunction with the process described above. In this example, the process begins with generating 1105 a representation of a stage for presenting graphical elements related to multimedia content provided by the media service and displaying 1110 a first view of the stage, wherein the first view of the stage includes a portion of the stage less than all of the stage. As noted above, the first view of the stage can comprise at least a first pane and a second pane, the first pane and the second pane including different portions of the stage. The first pane can include a first plurality of graphical elements representing content items available through the media service. If 1115 a user selects one of the first plurality of graphical elements, the selected graphical element can be displayed 1120 with a fly out effect within the first pane.

A first navigation element can also be displayed in the second pane as described above. The first navigation element can indicate a direction to additional portions of the stage. If 1125 a user selects the first navigation element, the view of the stage can be moved 1130 in a direction indicted by the navigation element. For example, the first pane can be replaced with a second navigation element indicating a direction of additional portions of the stage, the second pane can be moved to a previous location of the first pane, and a third pane can be displayed, the third pane including a portion of the stage represented by the first navigation element. The third pane can include a second plurality of graphical elements representing content items cached by the client application. In response to a user selection of one of the second plurality of graphical elements, he selected element can be displayed with a fly out effect in the third pane. In some cases, a pane of the interface, such as the second pane, can include a video preview window. In such a case, moving 1130 the second pane to a previous location of the first pane can comprise sliding the video preview window from a first location to a second location while content is playing in the preview window.

Figure 12A:
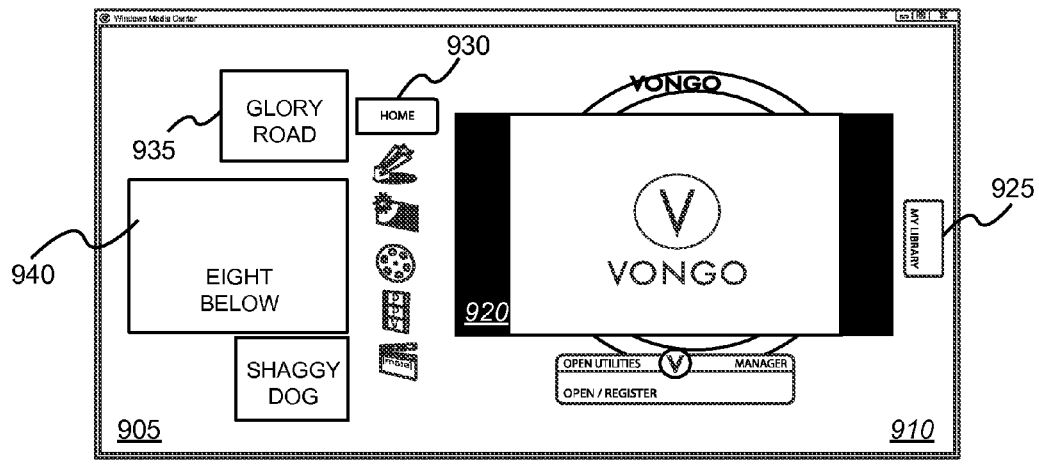
FIGS. 12A-12H illustrate an example of browsing content via the user interface according to one embodiment of the present invention.
Figure 12B:
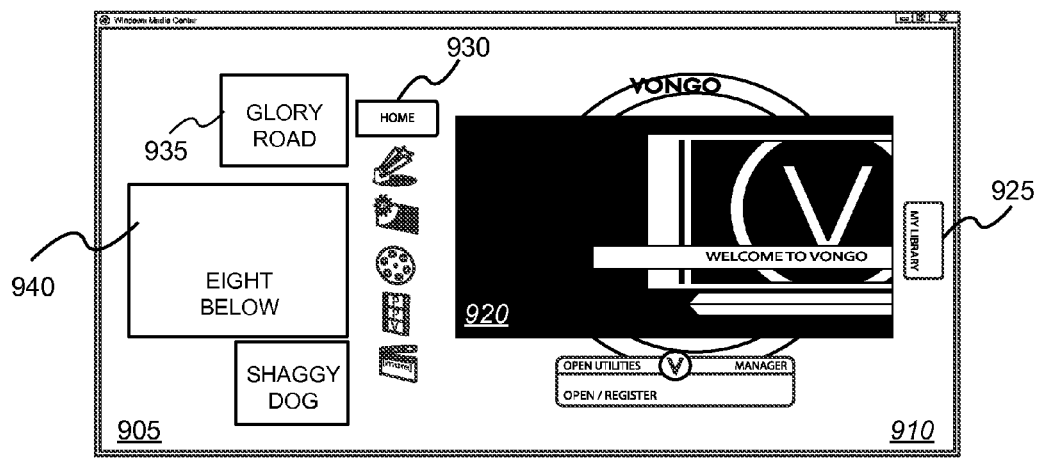
Figure 12C:
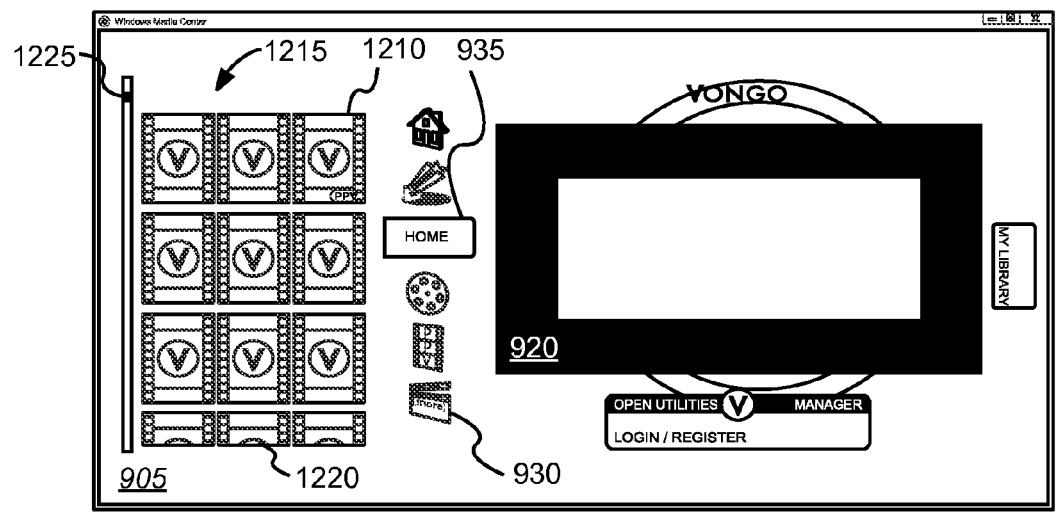
Figure 12D:
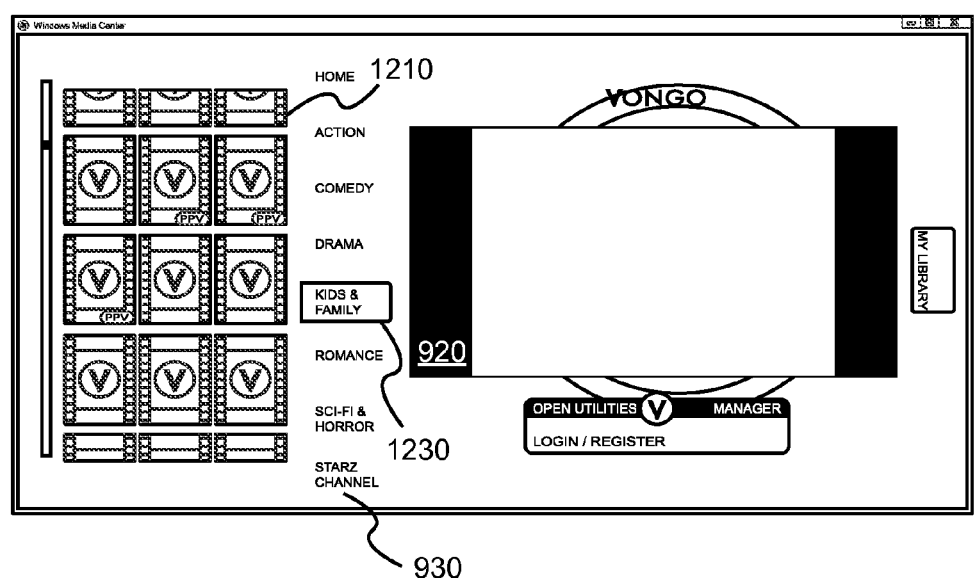
Figure 12E:
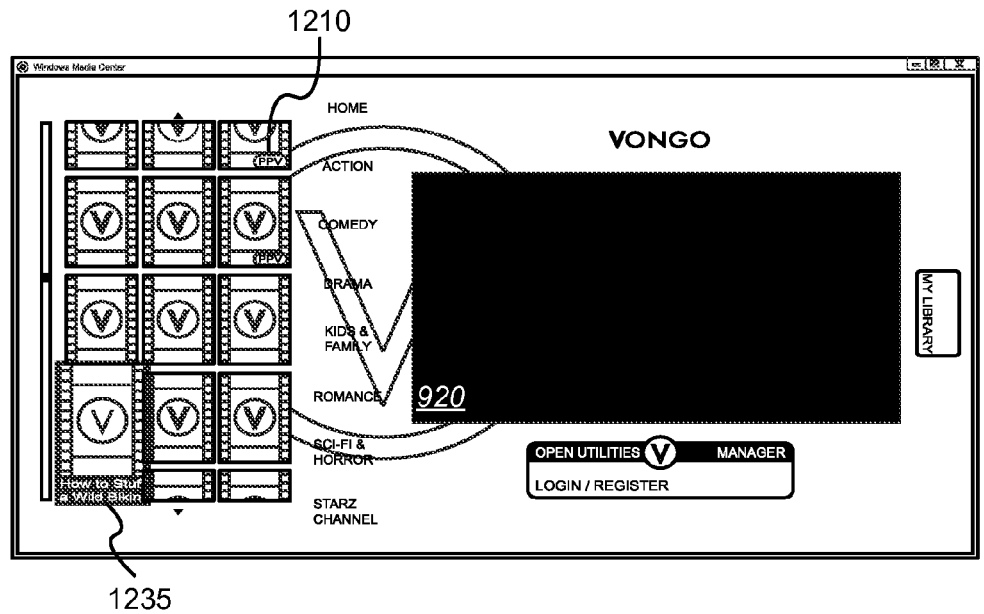
Figure 12F:
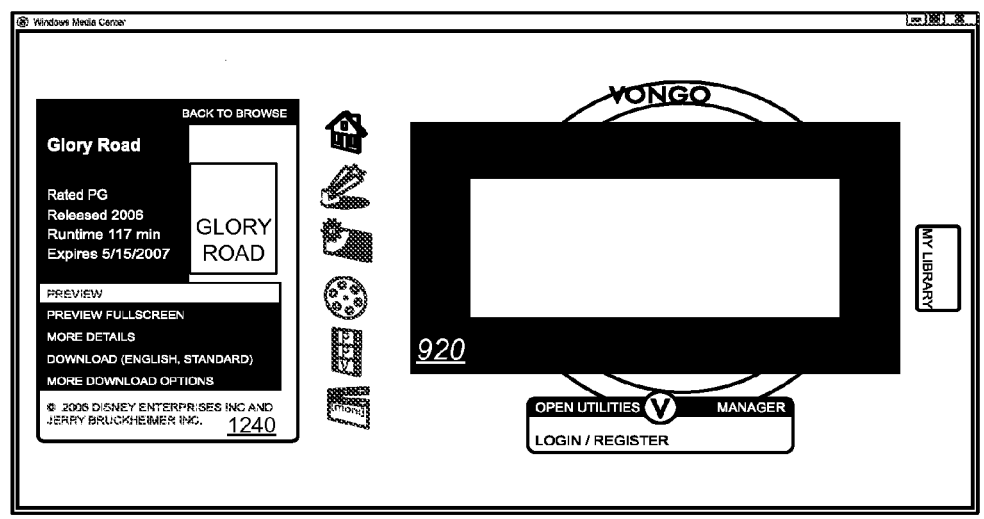
Figure 12G:
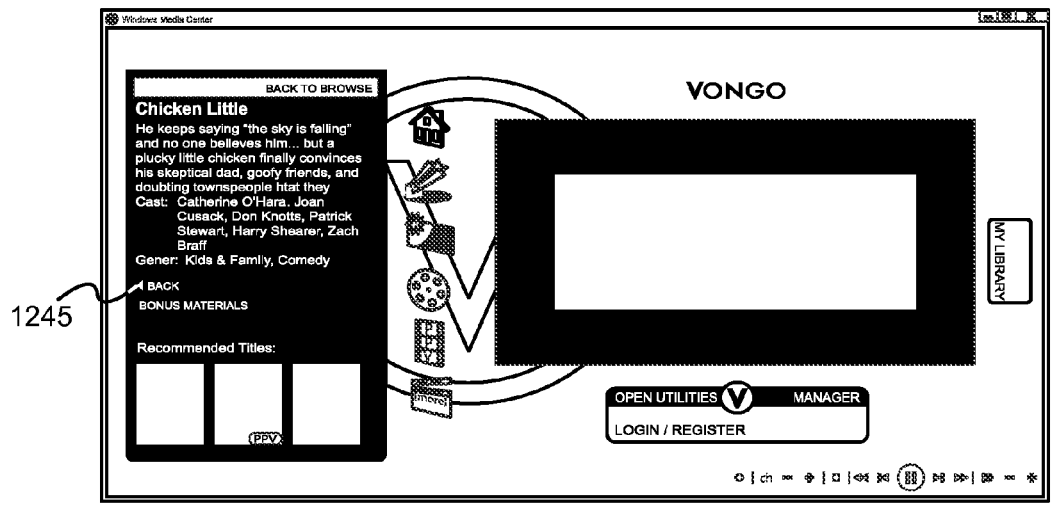
Figure 12H:
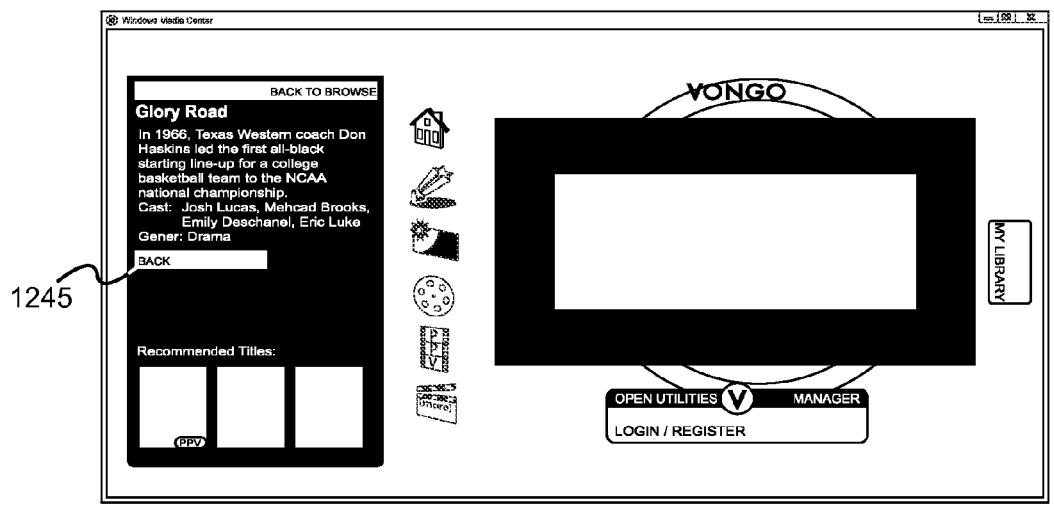

FIGS. 12A-12H illustrate an example of browsing content via the user interface according to one embodiment of the present invention. More specifically, FIGS. 12A and 12B illustrate display of a main or home screen similar to that illustrated in and above with reference to FIG. 9 including a right pane 910, left pane 905, preview window 920, icons 930, carousel 935, etc as described above. FIG. 12C illustrates the user interface after the user has selected a "Top Picks" menu selection 1205 from the set of icons 930. As a result of this selection, the carousel 935 of the left pane 905 has been replaced with a grid of graphics 1210 representing content items in the top picks category. It should also be noted that the grid 1210 extends beyond the view of the left pane 905 as indicated by the arrows 1215 and 1220 above and below the grid 1210 and the scroll bar 1225 to the left of the grid 1210.

FIG. 12D illustrates a further view of the interface in which the set of icons 930 have been replaced with a textual list of categories of content. Furthermore, one of the categories 1230 is highlighted to show selection of that item. It should be noted and understood that the grid of graphics 1210 representing content items also changes with the selection of a category of content.

FIG. 12E illustrates the user interface with one of the items 1235 in the grid 1210 highlighted. This highlighting may be provided, for example, in response to the user navigating over or otherwise selecting the content item 1235. For example, the user may use a mouse, remote control, or other device to move a cursor over, i.e., hover over, or highlight the item. Then, in response to the user selecting the highlighted item 1235 by clicking the mouse, pressing enter on the remote control, or providing another user input, additional details 1240 of the selected item can be displayed as illustrated in FIG. 12F. According to one embodiment, transition between the display illustrated in FIG. 12E and the display illustrated in FIG. 12F can include any of a variety of effects including a "fly out" effect in which the box or window displaying the details of the selected item moves along the Z-axis of the interface toward the user thus giving the appearance of flying out of the selected content item. Part of the fly out effect may also include spinning the box as it moves out.

Stated another way, embodiments of the present invention provide for use of the Z-axis of the user interface to provide a focus mechanism. That is, the user interface allows navigation in the horizontal directions (along the X-axis), along the vertical directions (along the Y-axis), and along the depth directions (along the Z-axis). Movement along the Z-axis can be used to provide a focus mechanism and/or to provide additional details and/or functions related to selected elements of the interface but without obscuring other portions of the interface or using those portions for further navigation. Furthermore, navigation along the Z-axis can be modal or non-modal.

It should also be noted that the details box 1240 as illustrated in FIG. 12F can include menu selections for previewing the selected item in the preview window 925 or in a full screen, obtaining additional details, downloading the content, etc. Options for navigating back 1245 to browse the available content can also be include as illustrated by the highlighted menu selections illustrated in FIGS. 12G and 12H.

Figure 13A:
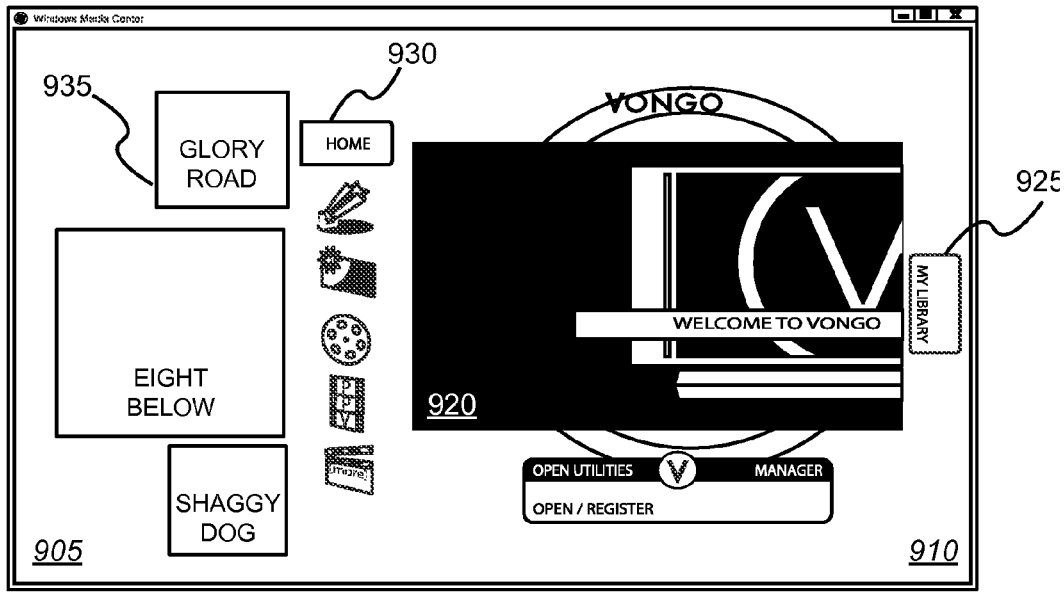
FIGS. 13A-13D illustrate another example of browsing content via the user interface according to one embodiment of the present invention.
Figure 13B:
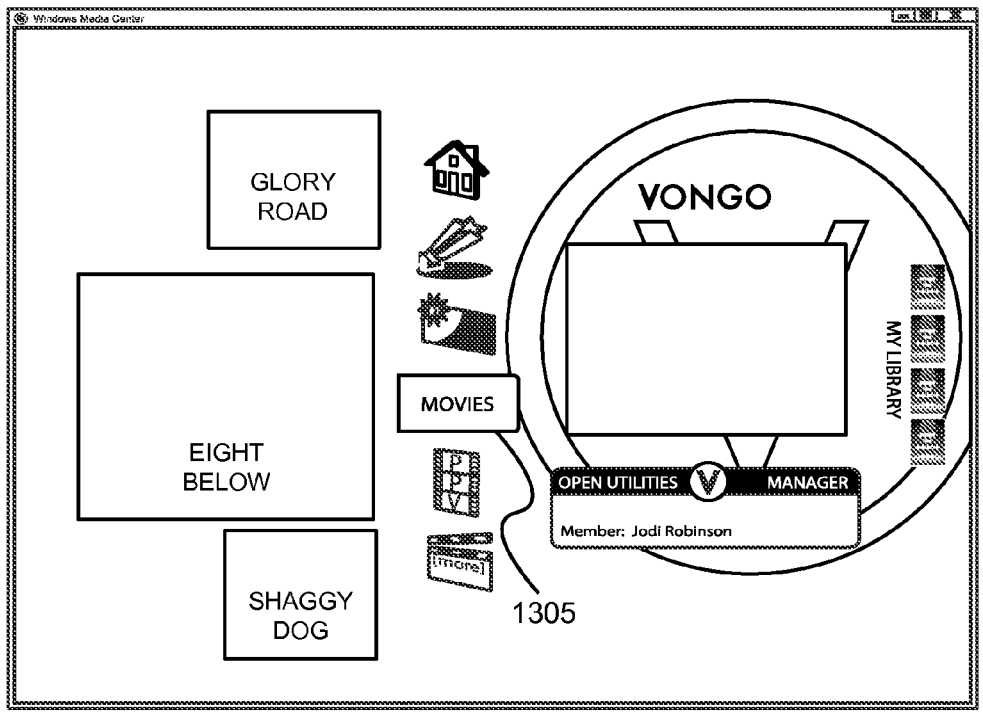
Figure 13C:
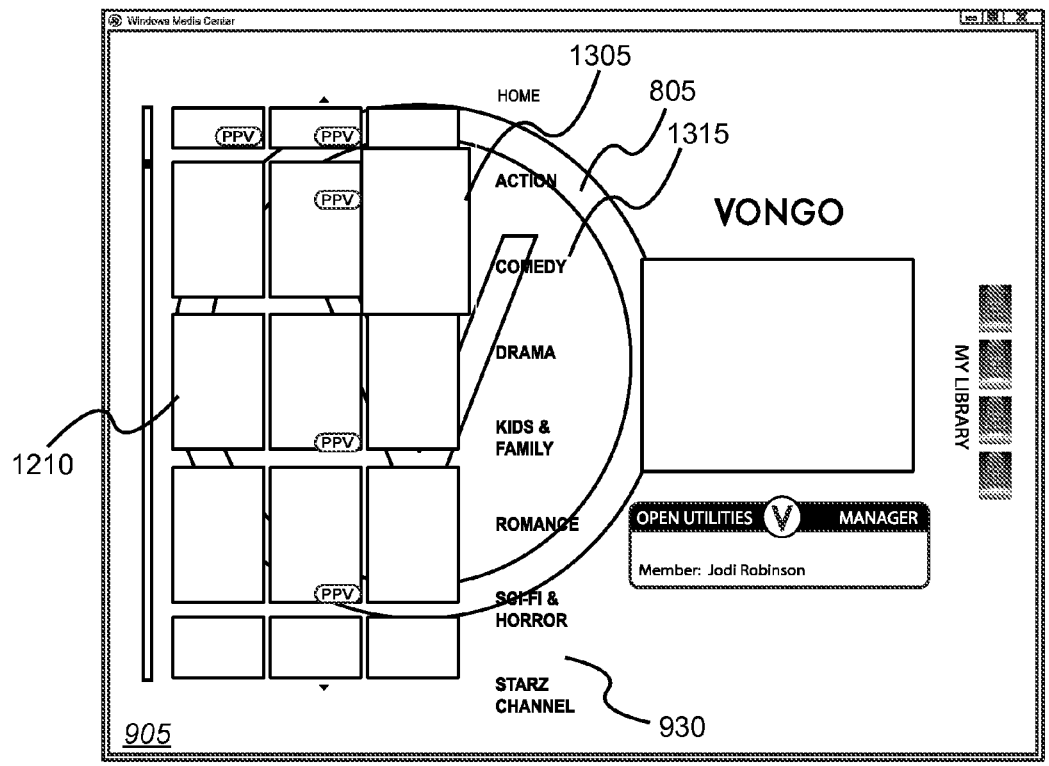
Figure 13D:
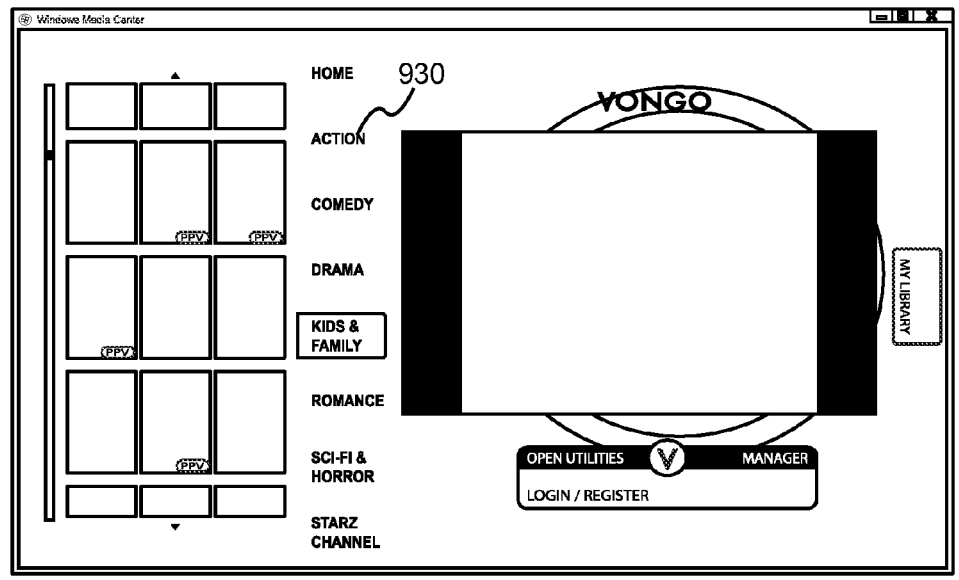

FIGS. 13A-13D illustrate another example of browsing content via the user interface according to one embodiment of the present invention. More specifically, FIG. 13A illustrates a home or main screen as described above with reference to FIG. 9 including a right pane 910, left pane 905, preview window 920, icons 930, carousel 935, etc as described above. FIG. 13B illustrates the display with the "Movies" icon selected and replaced with a textual description 1305. FIG. 13C illustrates a grid of graphics 1310 representing content items displayed in response to selection of the Movies menu item. Also in FIG. 13C, the menu of icons 930 has been replaced by a textual list of categories, one of the items 1315 in the grid 1210 is highlighted, i.e., moved toward the user along the Z-axis of the interface, and the spotlight 805 is moved to the left pane 905 to illustrate current focus. FIG. 13D illustrates a change in the grid of graphics 1210 representing content items in response to the user selecting a new category from the list of categories 930.

Once content of interest has been identified, the client can choose to download the content to the client device for viewing. For example, as illustrated in FIG. 12F, the user can select the "Download" button 1242 of the menu options in the detail box 1240. Furthermore, the user can be presented with options for downloading the content at the current time or at a later, perhaps scheduled, time.

Figure 14:
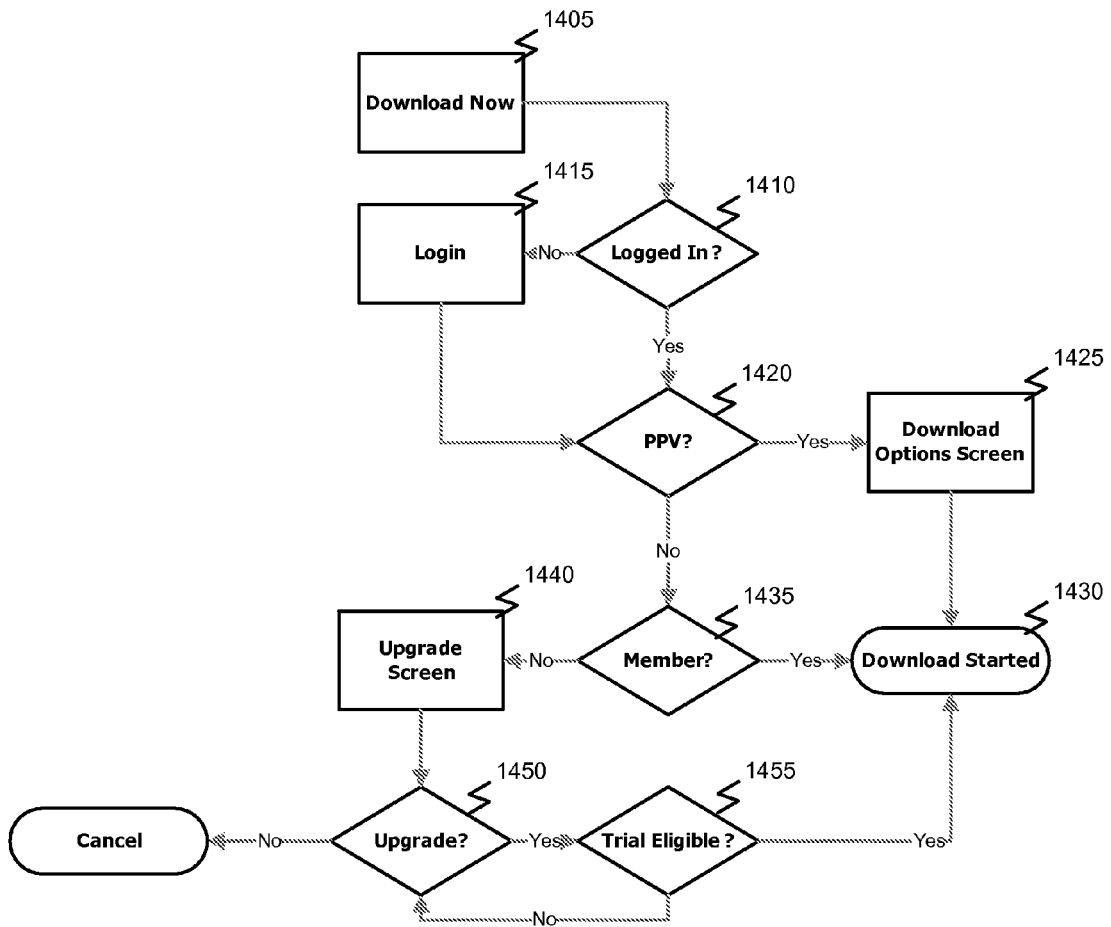
FIG. 14 is a flowchart illustrating a process for downloading content according to one embodiment of the present invention.

FIG. 14 is a flowchart illustrating a process for downloading content according to one embodiment of the present invention. In this example, the user elects to perform the download now, i.e., to start the download immediately or soon after the user selection. Depending upon the nature of the service, the content requested, etc. a number of determinations 1410, 1420, 1435, 1450, and 1455 can be made. For example, checks can be made to determine whether the requesting user is logged in 1410, whether the content is pay-per-view or free 1420, whether the user is a member of the service 1435, whether a visitor wants to upgrade to become a member 1450 or accept a trial offer 1455, etc. Based on the results of these determinations 1410, 1420, 1435, 1450, and 1455 a number of other screens can be displayed by the user interface. For example, if 1420 the content is pay-per-view a download options screen may be presented 1425 and a download started 1430. In another example, if 1435 the user is not a member or subscriber to the media service but membership is required to download the content, the user may be presented 1440 with an upgrade screen though which he may become a member. Finally, based on the outcome of these determinations and the user satisfying any requisite conditions for obtaining the content, the download can be started 1430.

Figure 15:
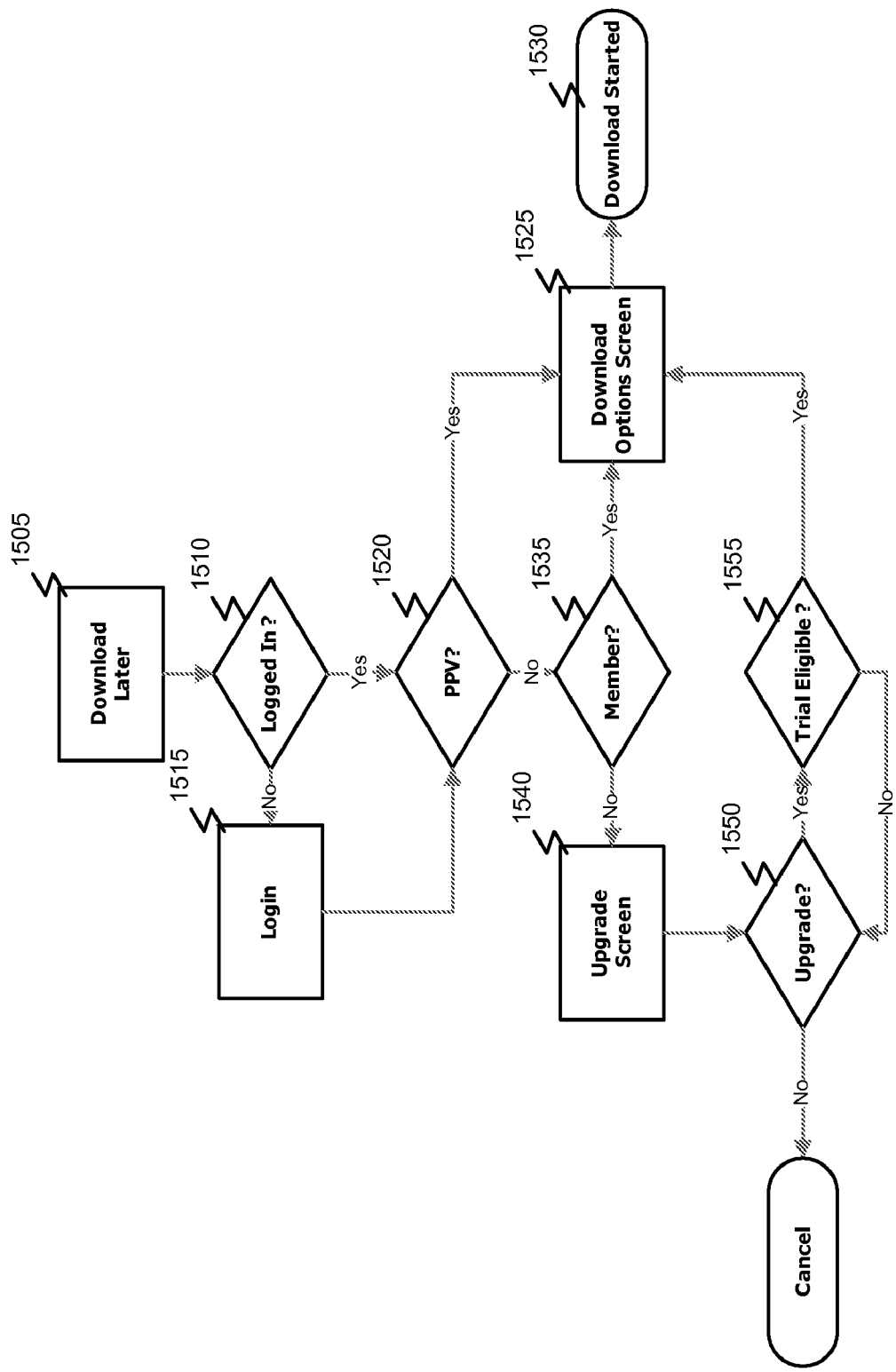
FIG. 15 is a flowchart illustrating a process for downloading content according to an alternative embodiment of the present invention.

FIG. 15 is a flowchart illustrating a process for downloading content according to an alternative embodiment of the present invention. In this example, the user elects 1505 to perform the download later, i.e., to start the download at some scheduled or later time. Depending upon the nature of the service, the content requested, etc. a number of determinations 1510, 1520, 1535, 1550, and 1555 can be made. For example, checks can be made to determine whether the requesting user is logged in 1510, whether the content is pay-per-view or free 1520, whether the user is a member of the service 1535, whether a visitor wants to upgrade to become a member 1550 or accept a trial offer 1555, etc. Based on the results of these determinations 1510, 1520, 1535, 1550, and 1555 a number of other screens can be displayed by the user interface. For example, if 1520 the content is pay-per-view a download options screen may be presented 1525 and a download started 1530. In another example, if 1535 the user is not a member or subscriber to the media service but membership is required to download the content, the user may be presented 1540 with an upgrade screen though which he may become a member. Finally, based on the outcome of these determinations and the user satisfying any requisite conditions for obtaining the content, the download can be scheduled 1530 or queued for delivery to the user. The actual download may be performed at a scheduled time, on an as-available basis, or based on some other arrangement.

Figure 16A:
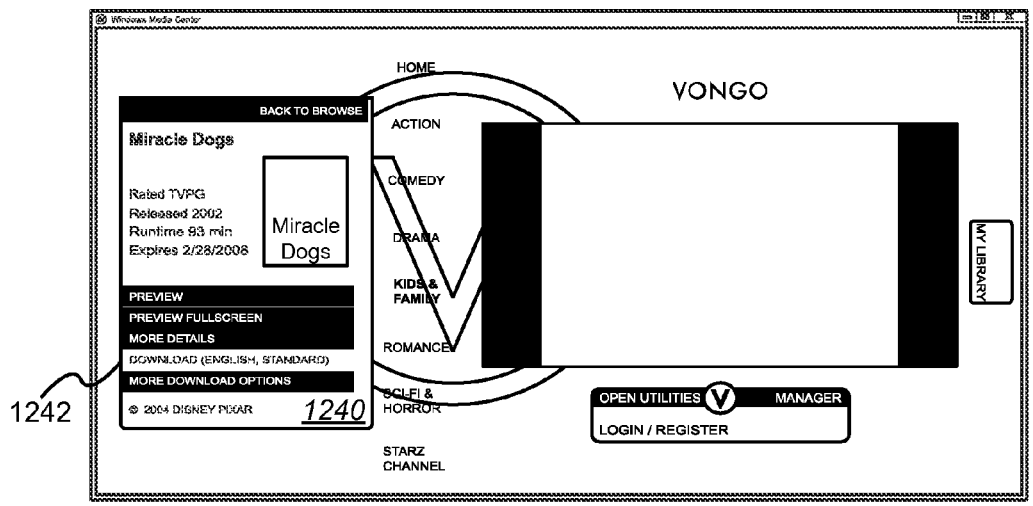
FIGS. 16A-16J illustrate an example of downloading content through the user interface according to one embodiment of the present invention.
Figure 16B:
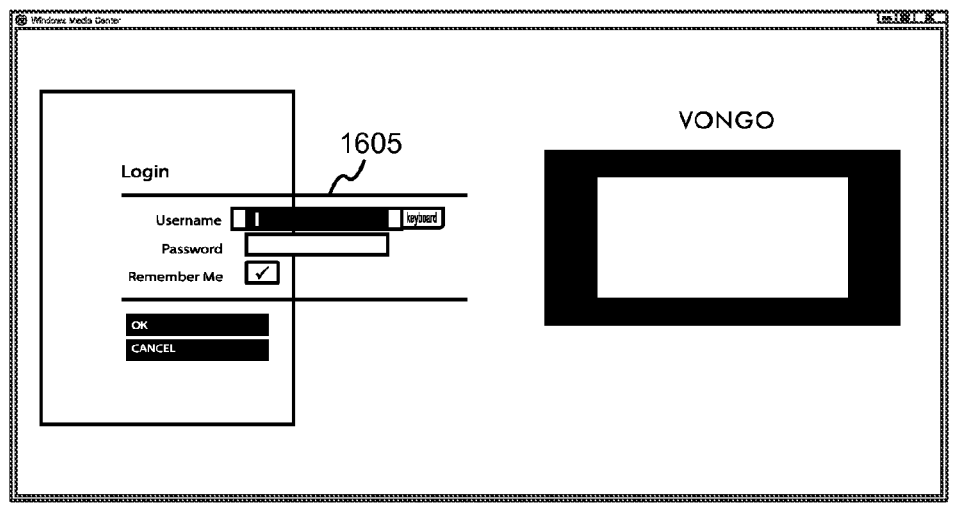
Figure 16C:
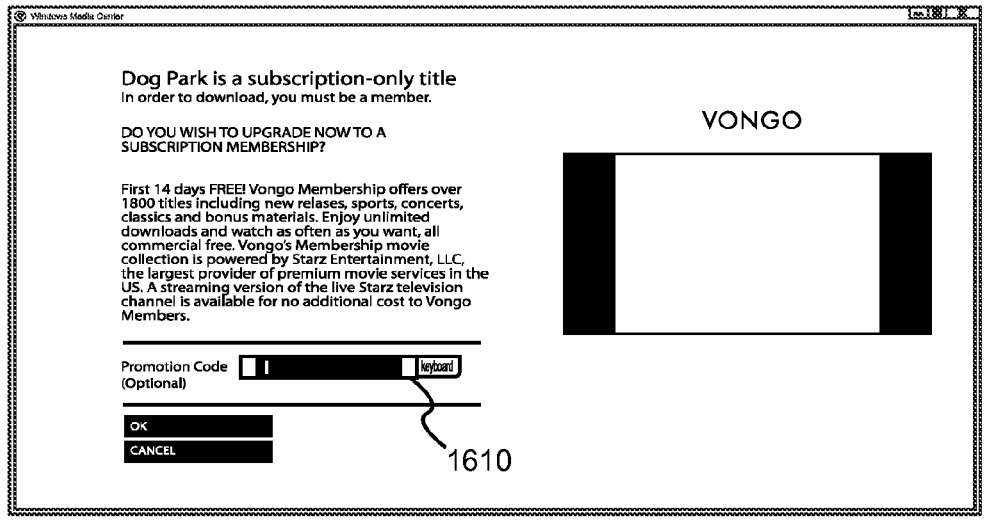

FIGS. 16A-16J illustrate an example of downloading content through the user interface according to one embodiment of the present invention. More specifically, FIG. 16A illustrates selection of the download menu option 1242 from the details box 1240 for a selected content item. As noted above, the user may be required to log in to download content. FIG. 16B illustrates a screen that may be presented to allow the user to log in via a login dialog box 1605. Also as noted above, a user may be required by the media service to be a member in order to download content. FIG. 16C illustrates a screen that may be presented to a user to allow the user to enter a code via text box 1610 to initiate a trial membership or to upgrade from a trial membership to a full membership.

Figure 16D:
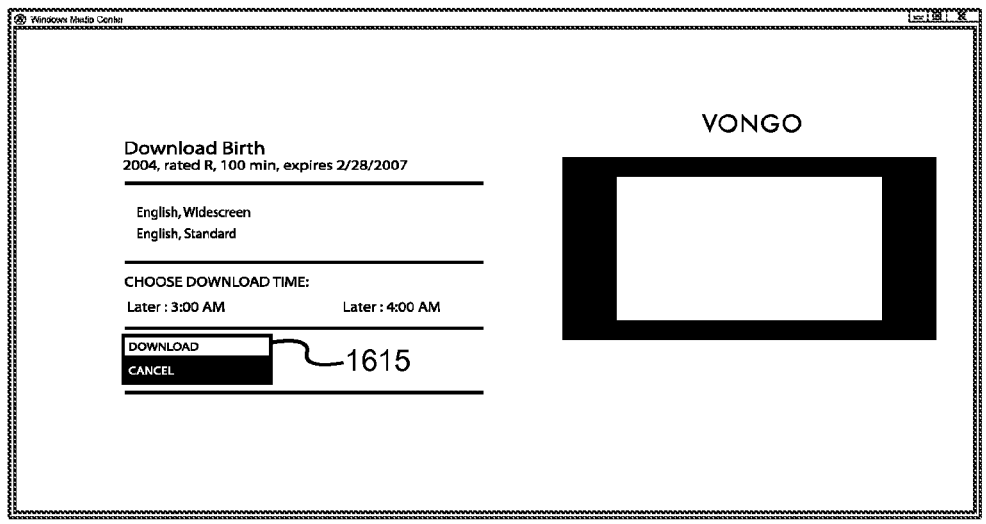
Figure 16E:
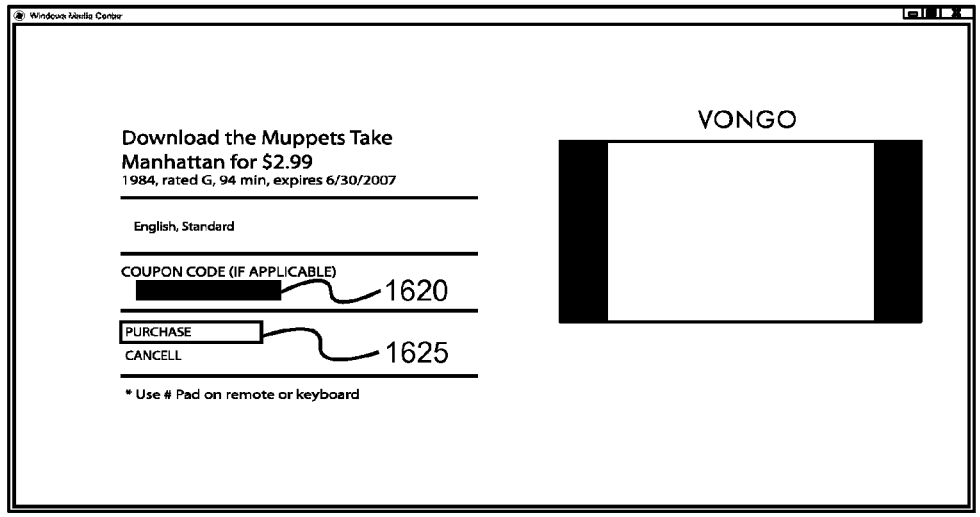
Figure 16F:
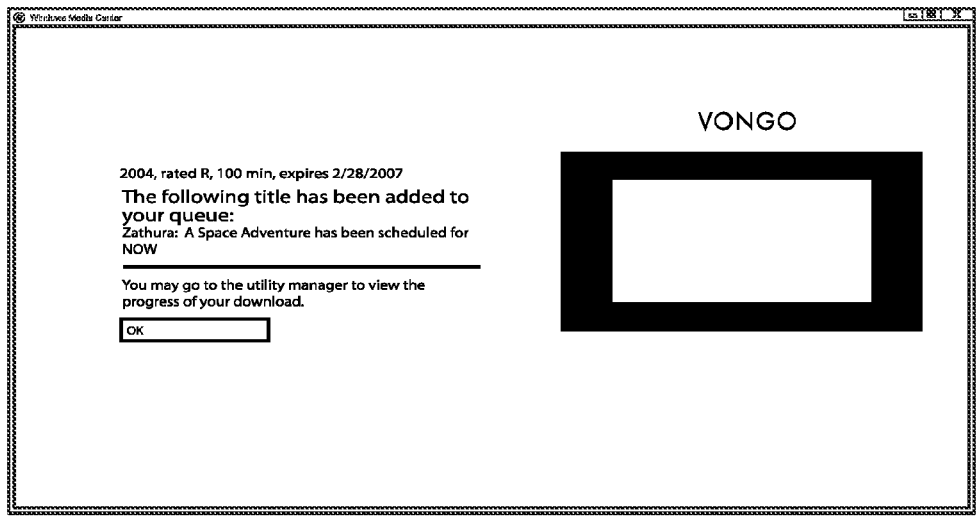
Figure 16G:
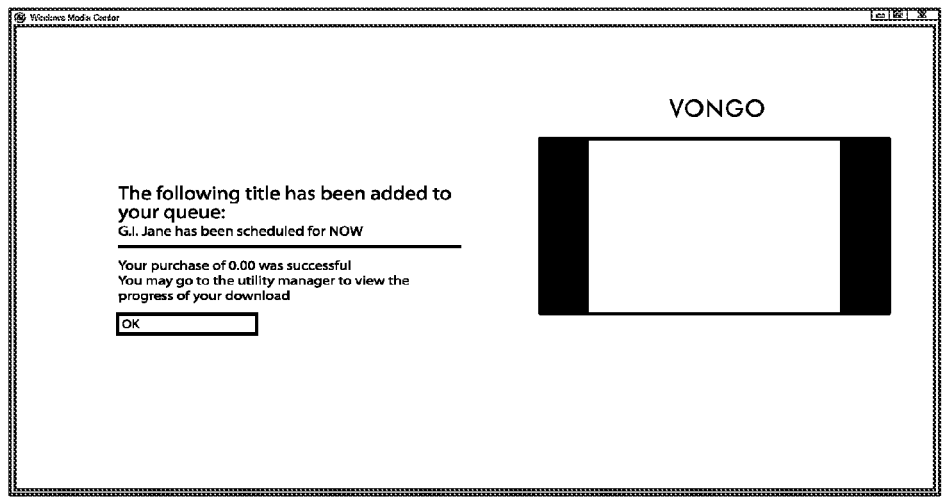

FIG. 16D illustrates a screen that may be displayed for scheduling and initiating a download of the selected content by clicking or selecting a download button 1615. As noted above, some content may be available on a pay-per-view basis. FIG. 16E illustrates a screen that may be displayed in such a case to allow the user to pay for the requested content by entering a coupon code in a textbox 1620 and/or clicking or selectin a purchase button 1625. FIGS. 16F and 16G illustrate screens that can be displayed to confirm a users request for a download.

Figure 16H:
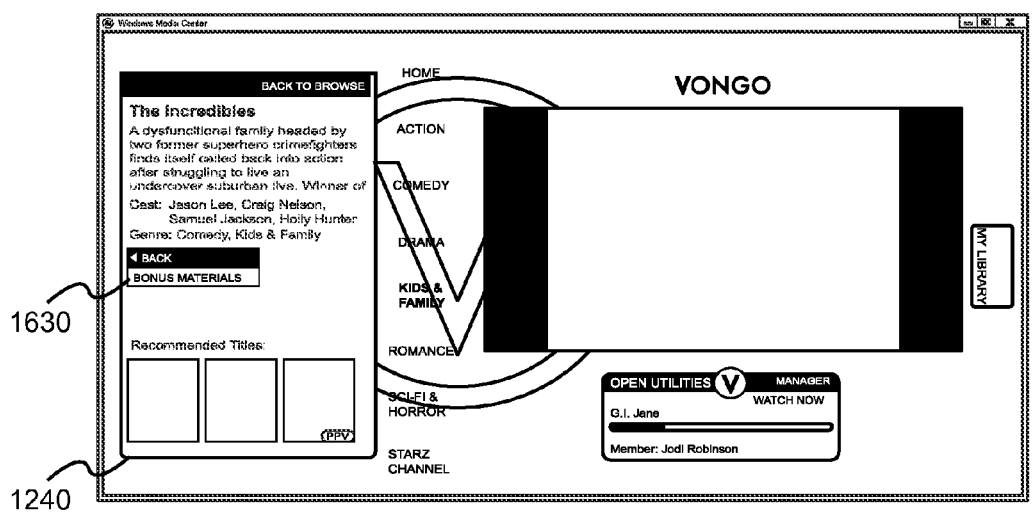
Figure 16I:
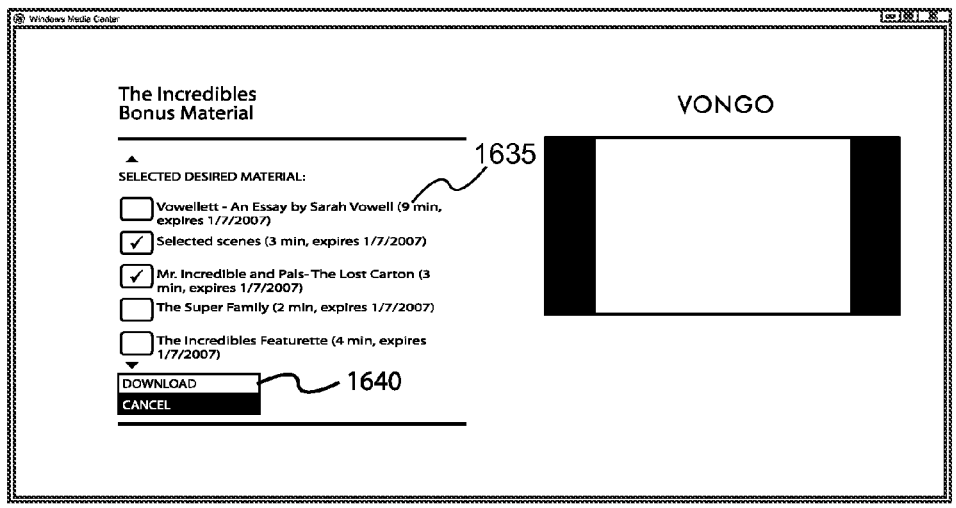
Figure 16J:
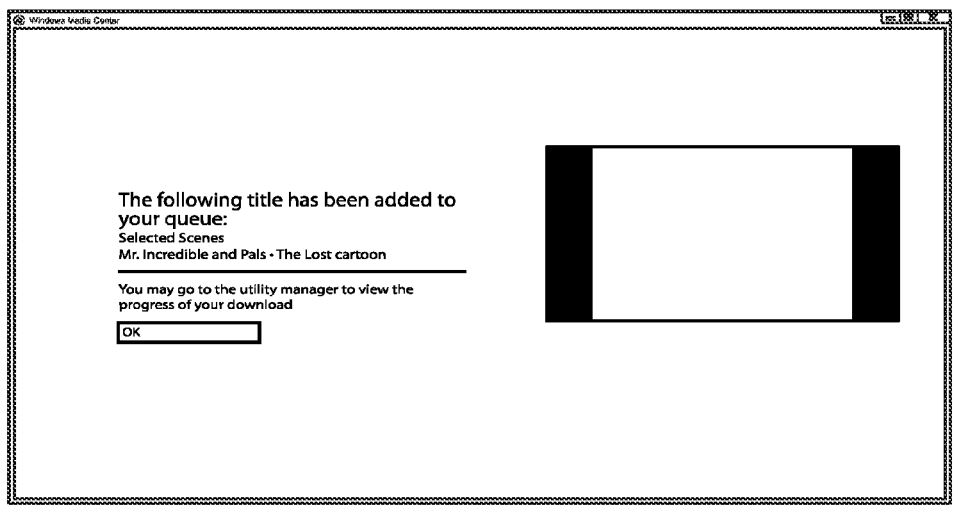

FIGS. 16H-16J represent an alternative or additional sequence of displays that can be presented to a user requesting content such as bonus material. More specifically, FIG. 16H illustrates selection of the Bonus Materials menu option 1630 from the details box 1240 for a selected content item. FIG. 16I illustrates a screen including a series of checkboxes 1635 for selecting from available bonus material for a particular content item and a Download button 1640 for initiating the download upon selection of the bonus material. Finally, FIG. 16J illustrates a screen that can be displayed to confirm a users request for a download.

Figure 17A:
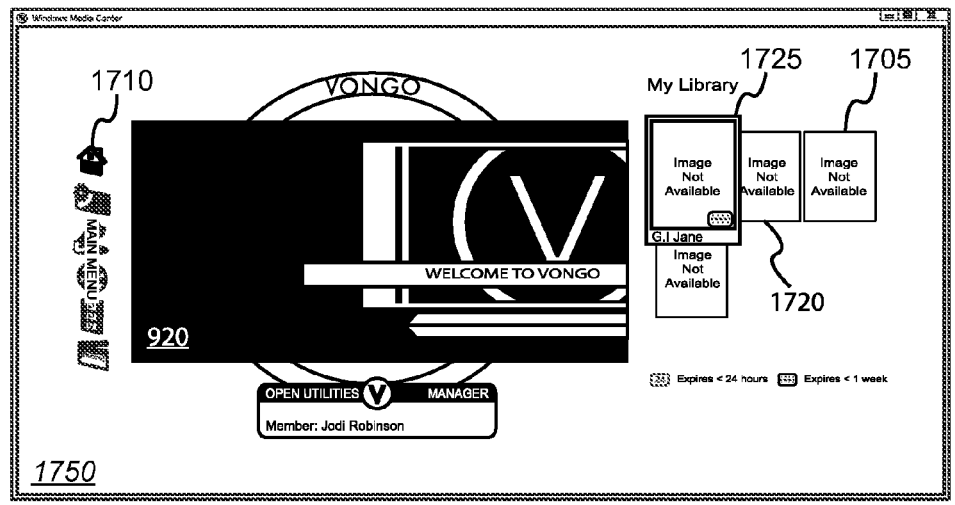
FIGS. 17A-17D illustrate an example of selection and playback of content from a user library of the user interface according to one embodiment of the present invention.

Once requested content has been downloaded to the user's device, it can be placed in the users "library" and made available for viewing. FIGS. 17A-17D illustrate an example of selection and playback of content from a user library 1705 of the user interface according to one embodiment of the present invention. As noted above, according to one embodiment, the library 1705 may comprise a portion of the stage to the right of the right pane 905 when the main or home screen is displayed. Also as noted above, this portion of the stage can be represented by a tab or other graphic 925 representing the portion of the stage outside of the view. When the user selects this representation 925, the view of the stage can shift right revealing the library 1705 as illustrated in FIG. 17A. As shown in this example, the left side of the stage, including the carousel and set of icons representing the main menu are now no longer visible. Instead, these elements have been replaced with a tab or other representation 1710 of the main menu and other elements. Also, the preview window 920 has shifted left into what is now the left pane 1715 the left pane. According to one embodiment, rather than simply re-drawing the preview window 920 in a new location, the preview window 920 can be made to shift left in the view of the stage as the view shifts right on the stage giving a visual effect of everything sliding to the left in the view. That is, rather than stopping or pausing the video while the preview window 920 is moved or redrawn, embodiments of the present invention provide for sliding the preview window within the view of the stage while the video is playing in the preview window.

Figure 17B:
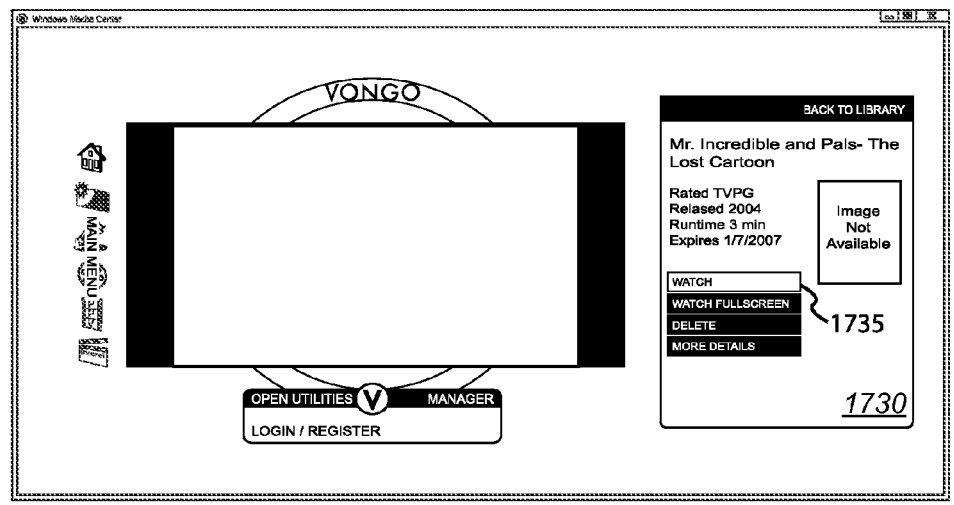

Also illustrated in FIG. 17A is a grid of graphics 1720 similar to the grid illustrated in and described with reference to FIGS. 12C and 12D above. That is, the graphics of the grid 1720 can represent content items available in the user's library. FIG. 17A also illustrates one of the items 1725 in the grid 1720 highlighted. This highlighting may be provided, for example, in response to the user navigating over or otherwise selecting the content item. For example, the user may use a mouse, remote control, or other device to move a cursor over, i.e., hover over, or highlight the item. Then, in response to the user selecting the highlighted item 1725 by clicking the mouse, pressing enter on the remote control, or providing another user input, additional details 1730 of the selected item 1725 can be displayed as illustrated in FIG. 17B. According to one embodiment, transition between the display illustrated in FIG. 17A and the display illustrated in FIG. 17B can include any of a variety of effects including a "fly out" effect in which the box or window 1730 displaying the details of the selected item 1725 moves along the Z-axis of the interface toward the user thus giving the appearance of flying out of the selected content item 1725. Part of the fly out effect may also include spinning the box as it moves out.

It should also be noted that the details box 1730 as illustrated in FIG. 17B can include menu selections 1735 for watching the selected item in the preview window or in a full screen, obtaining additional details, etc. Options for deleting the content and obtaining additional details can also be included as illustrated by the menu selections illustrated in FIG. 17B.

Figure 17C:
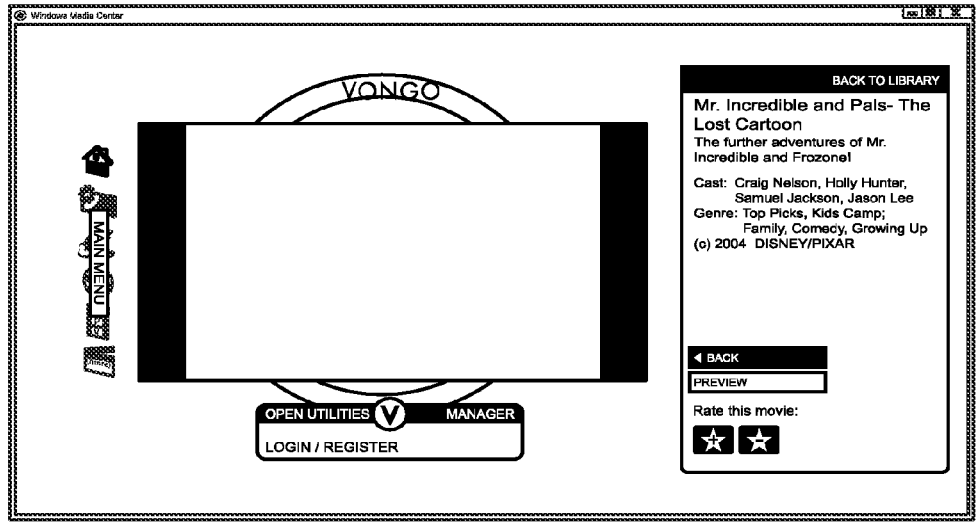
Figure 17D:
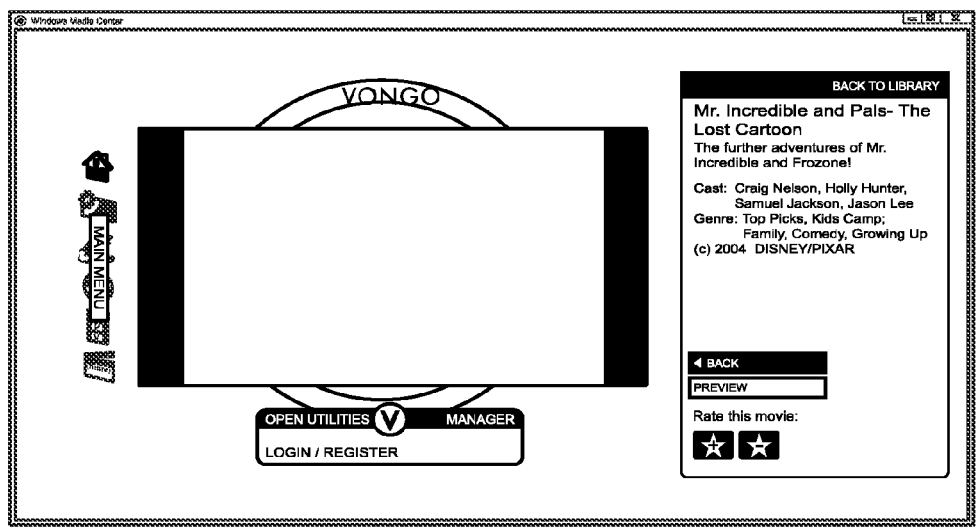

FIG. 17C illustrates a screen that can be displayed in response to the user selecting the More Details menu option from the screen illustrated in FIG. 17B. In this example, additional details 1740 about the content are displayed along with menu options 1745 for navigating back, previewing the content, and rating the content. FIG. 17D illustrates the results 1750 of a user rating of the content.

Figure 18A:
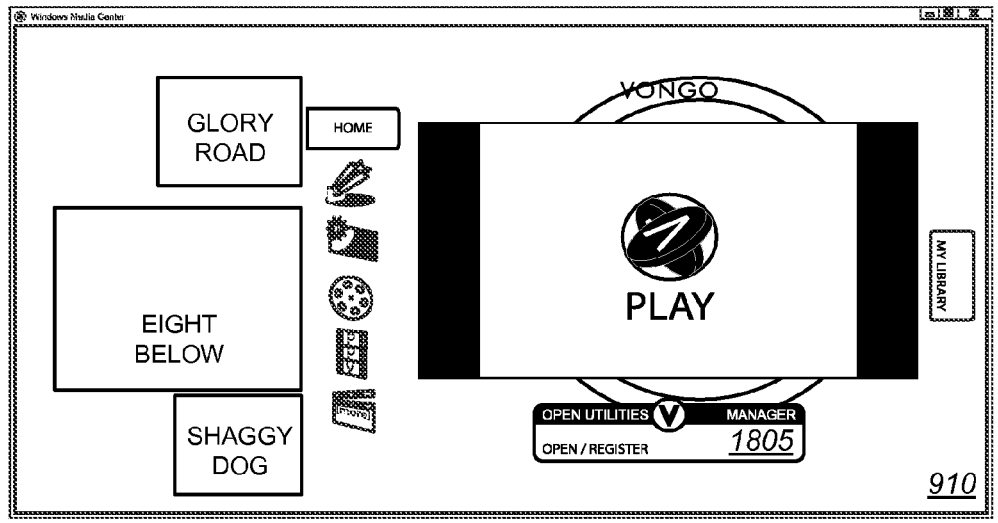
FIGS. 18A-18E illustrate examples of a utility manager of the user interface according to one embodiment of the present invention.
Figure 18B:
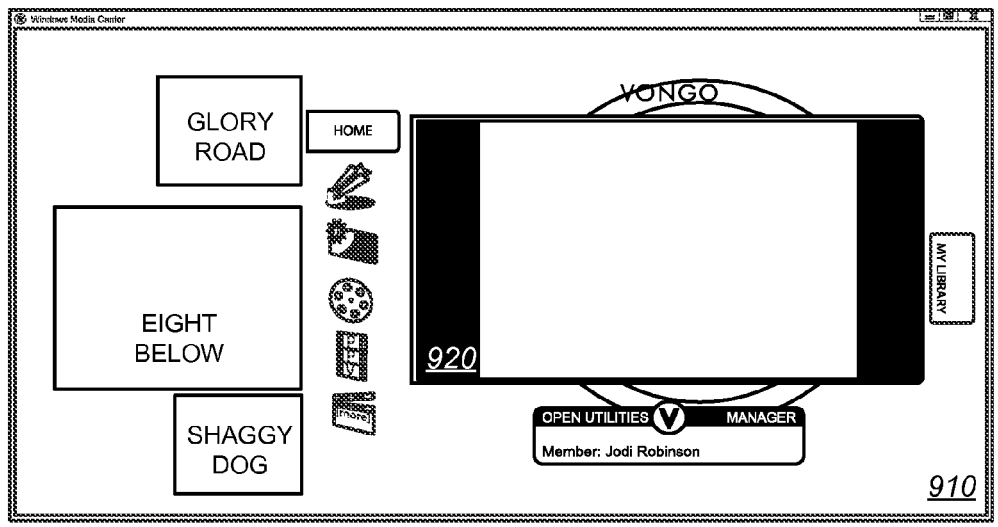
Figure 18C:
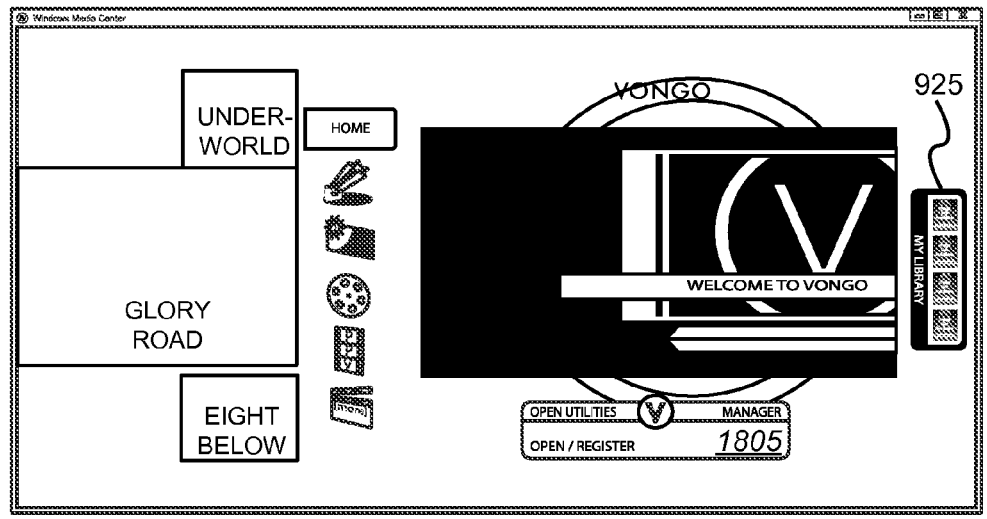
Figure 18D:
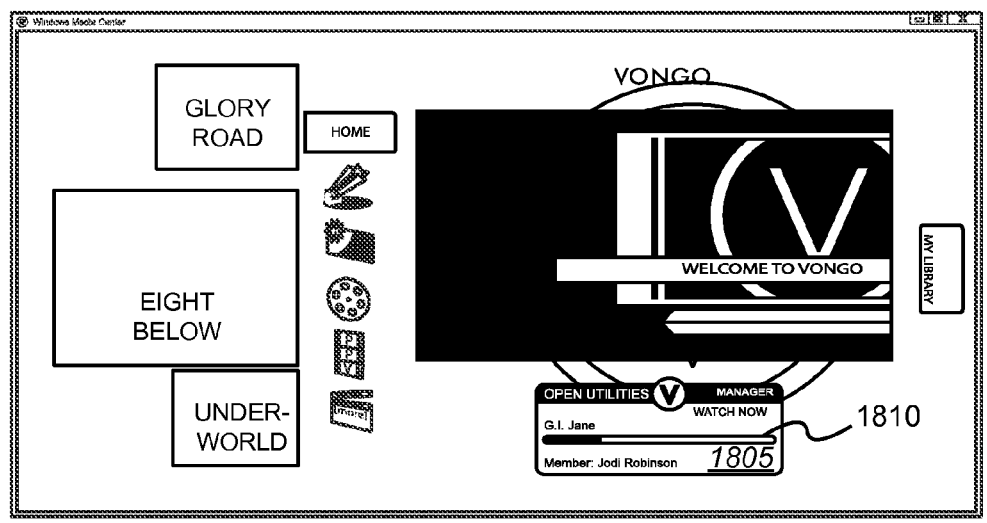
Figure 18E:
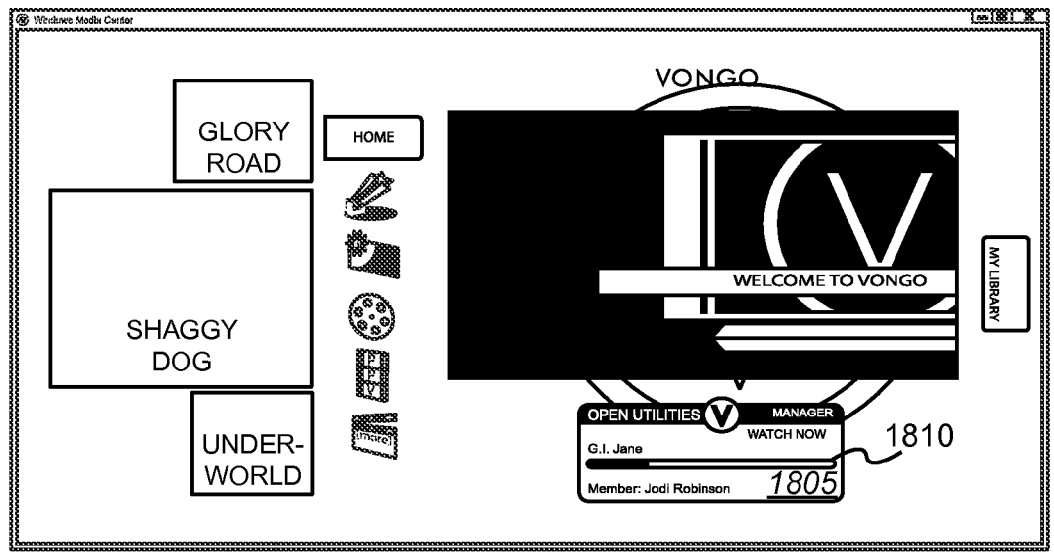

According to one embodiment, the interface can also provide a number of utilities. For example, FIGS. 18A-18E illustrate examples of a utility manager of the user interface according to one embodiment of the present invention. More specifically, FIG. 18A illustrates a Manager element 1805 that can be selected to initiate the utilities to, for example, allow the user to log in. FIGS. 18B and 18C illustrate the same display after the user has logged in thus enabling access to or starting the preview window 920, library navigation element 925, etc. The utility manager element can also display a bar or other graphic illustrating progress of a download in progress. For example, FIGS. 18D and 18E illustrate the utility manager element 1805 including the progress bar 1810 during different points in time while downloading a content item.

Figure 19A:
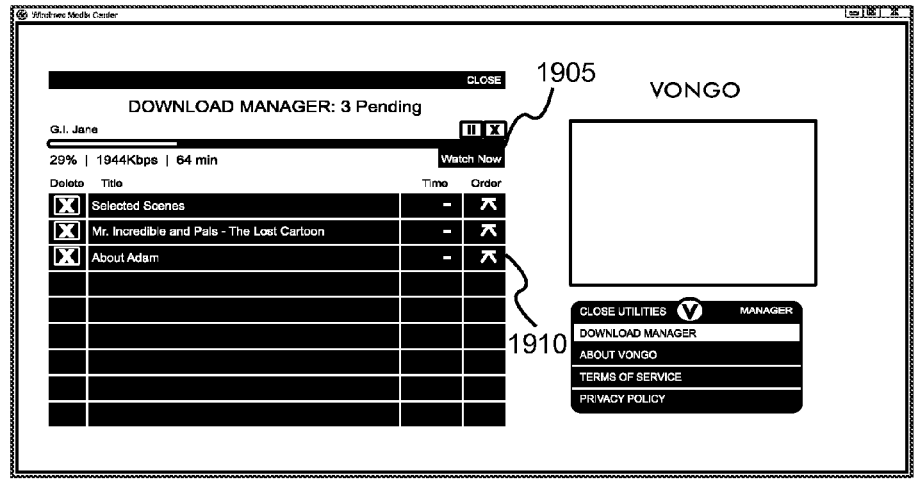
FIGS. 19A and 19B illustrate examples of a download manager utility of the user interface according to one embodiment of the present invention.
Figure 19B:
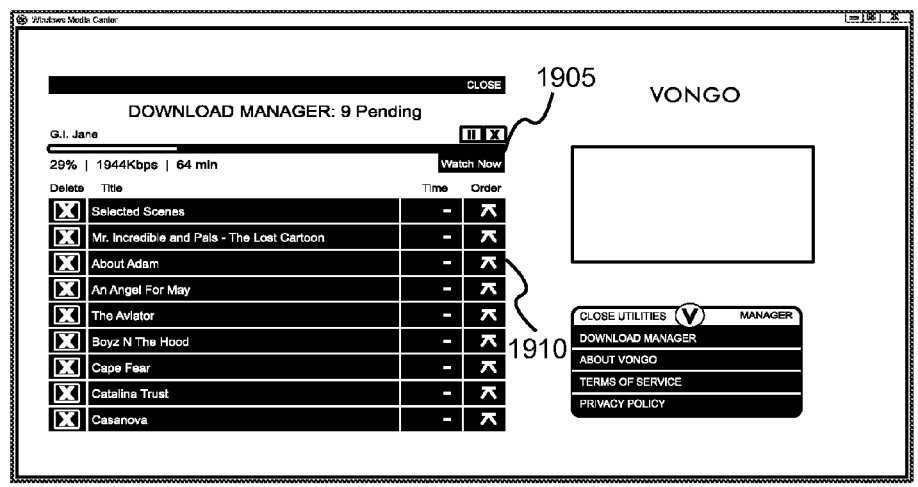

According to one embodiment, the interface can also additionally or alternatively provide a download manager utility. FIGS. 19A and 19B illustrate examples of a download manager utility of the user interface according to one embodiment of the present invention. In these examples, the display includes a progress bar 1905 similar to that described above with reference to FIGS. 18D and 18E as well as other progress information. The displays also include a queue or list 1910 of pending downloads.

Figure 20A:
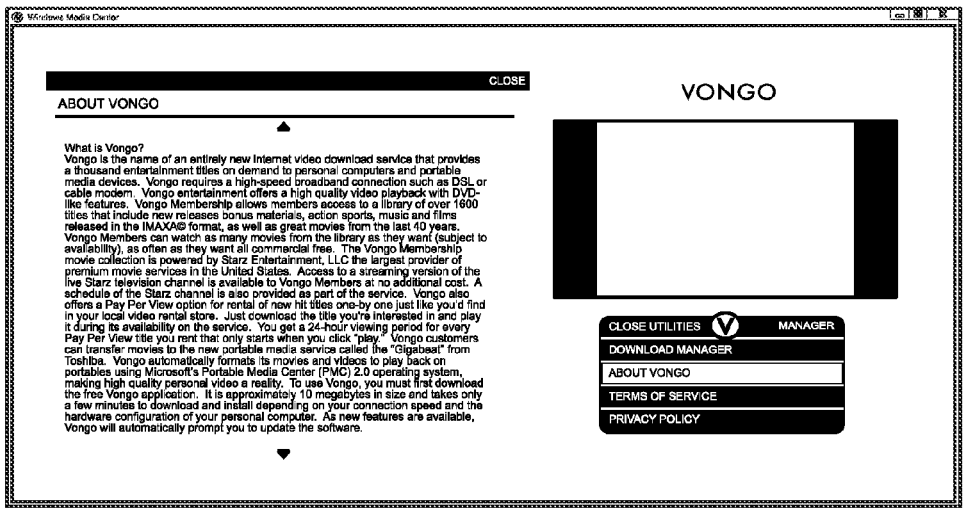
FIGS. 20A-20C illustrate examples of an information utility of the user interface according to one embodiment of the present invention.
Figure 20B:
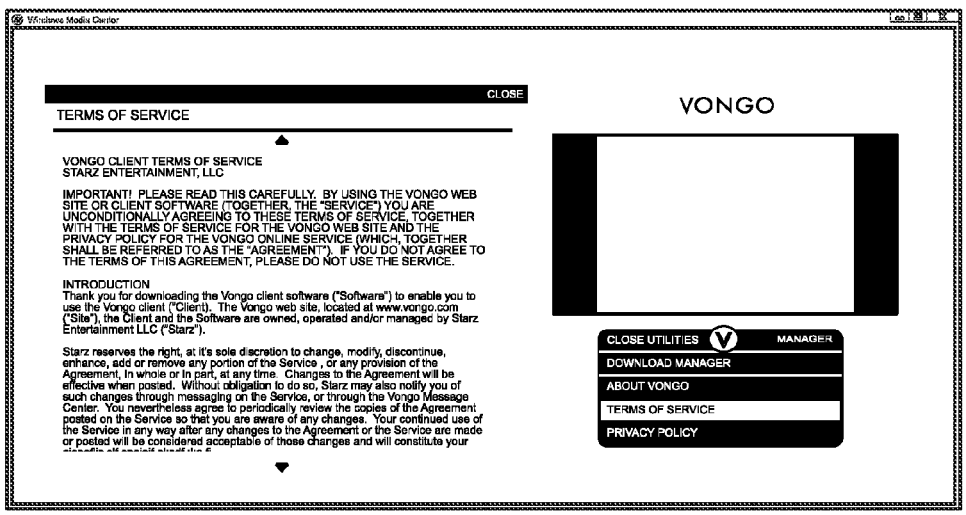
Figure 20C:
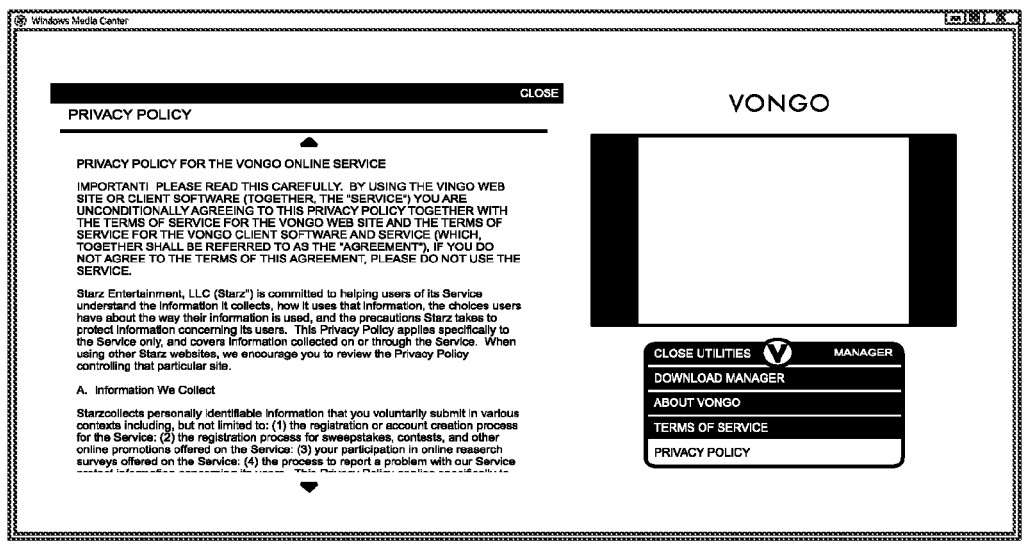

According to one embodiment, the interface can alternatively or additionally provide an information utility. FIGS. 20A-20C illustrate examples of an information utility of the user interface according to one embodiment of the present invention. These examples illustrate display of exemplary types of information that can be provided including but not limited to general information about the service (FIG. 20A), terms of service (FIG. 20B), a privacy policy (FIG. 20C), etc.

Figure 21A:
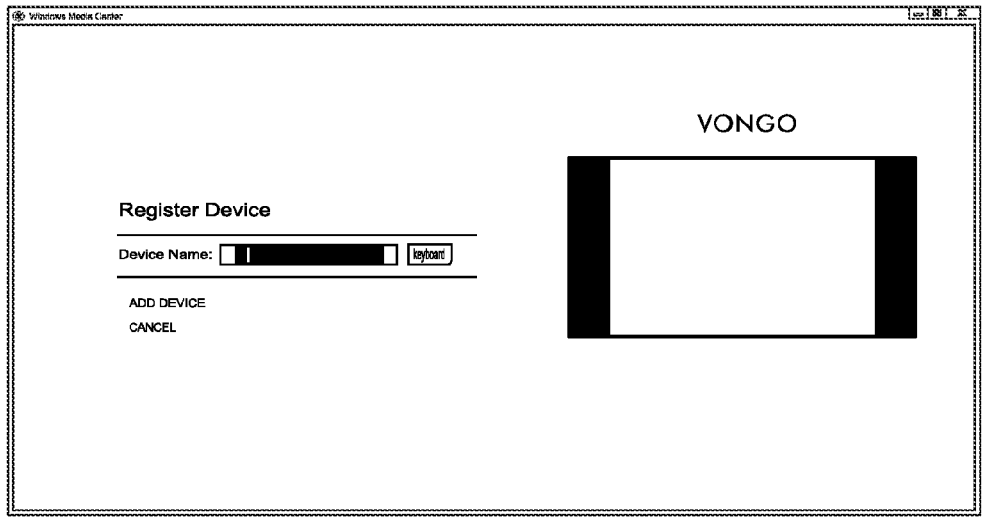
FIGS. 21A and 21B illustrate examples of a device registration utility of the user interface according to one embodiment of the present invention.
Figure 21B:
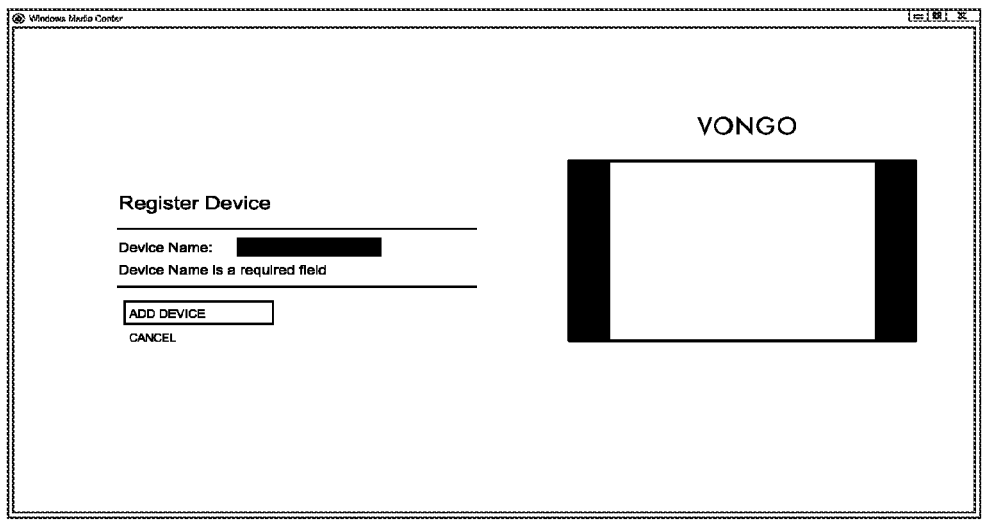

According to one embodiment, the interface can alternatively or additionally provide a device registration utility. That is, a utility can be provided for registering device for accessing the media service and/or playing content downloaded there from. FIGS. 21A and 21B illustrate examples of a device registration utility of the user interface according to one embodiment of the present invention. FIG. 21A illustrates a utility display including a text box 2105 for entering a device name while FIG. 21B illustrates the same display with an "Add Device" menu selection 2110 highlighted which can be selected to affect the addition.

Figure 22A:
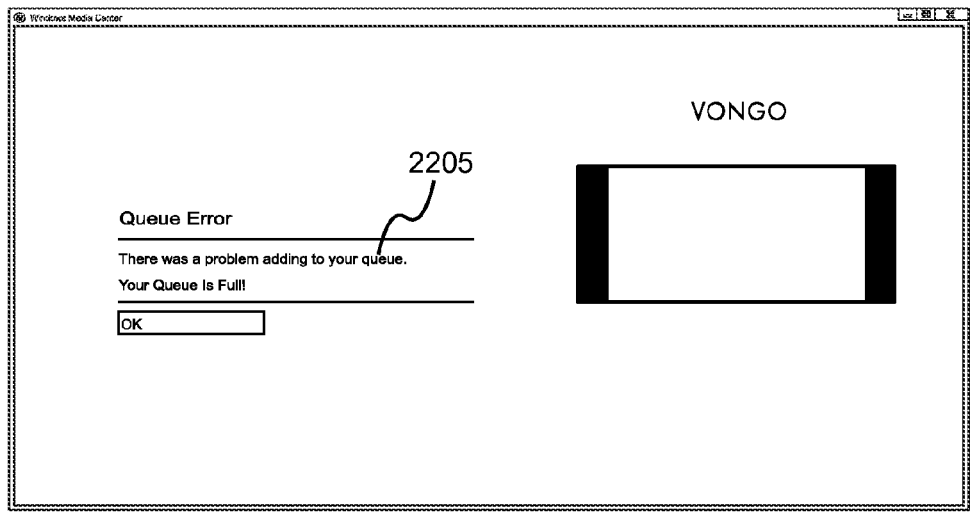
FIGS. 22A and 22B illustrate exemplary error messages of the user interface according to one embodiment of the present invention.
Figure 22B:
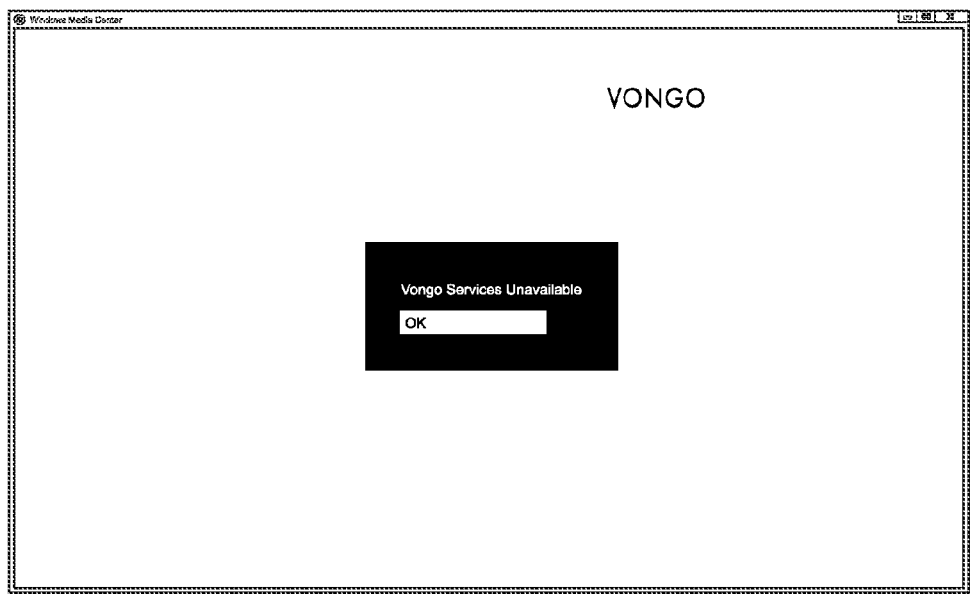

During operation of the client application a number of errors may occur. Thus, the interface may present any number of possible error messages. FIGS. 22A and 22B illustrate exemplary error messages of the user interface according to one embodiment of the present invention. More specifically, FIG. 22A illustrates a message 2205 that can be presented in the event that the user's download queue becomes full. FIG. 22B illustrates an example of an error display that may be provided by the interface in the event that the media service becomes unavailable, for example, due to the user's device losing communications.

Figure 23A:
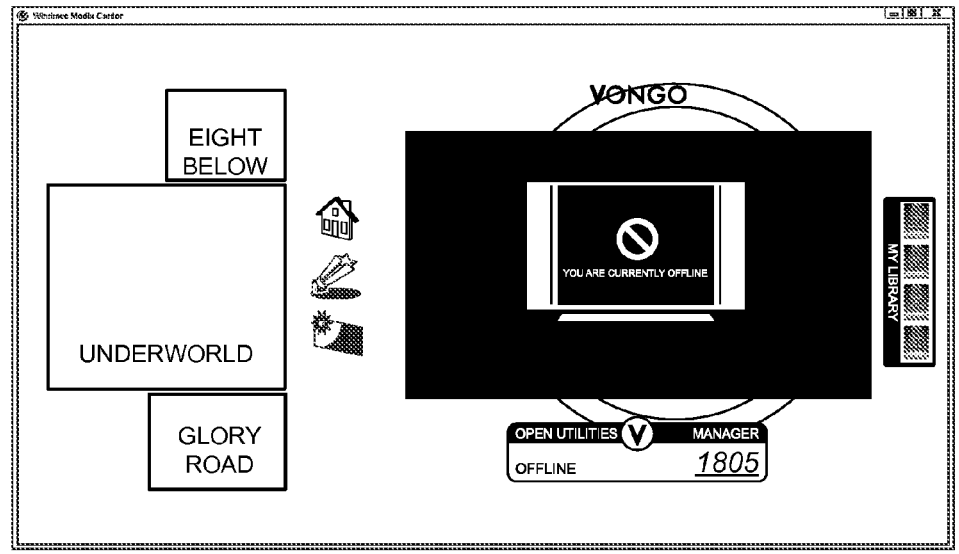
FIGS. 23A and 23B illustrate examples of off-line mode operation of the user interface according to one embodiment of the present invention.
Figure 23B:
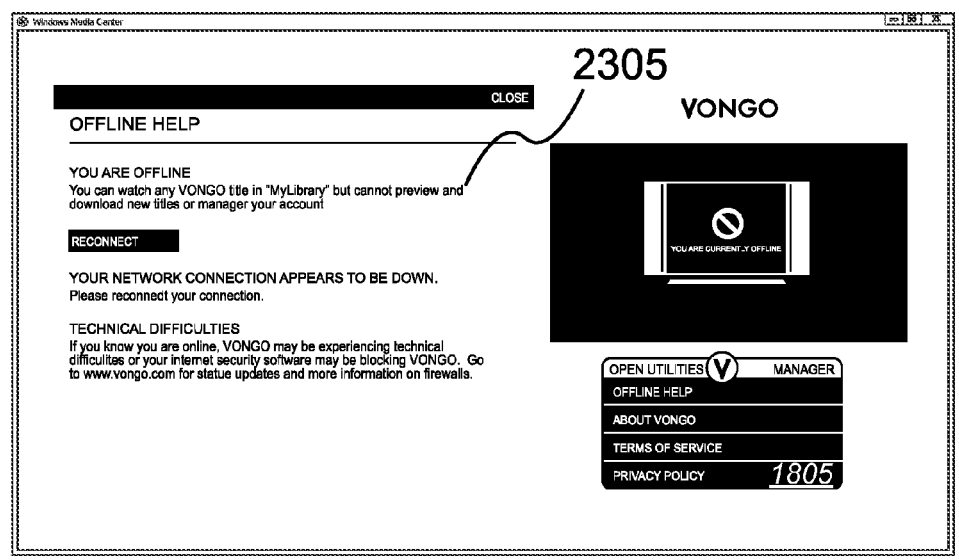

Furthermore, the client application can, according to one embodiment, provide an offline mode. For example, such a mode may operate in the event that the media service becomes unavailable, the client device loses communications or does not have sufficient bandwidth available, or for other reasons. FIGS. 23A and 23B illustrate examples of off-line mode operation of the user interface according to one embodiment of the present invention. More specifically, FIG. 23A illustrates an example of the main or home display described above with reference to FIG. 9 when the client application is in offline mode. In this case example, the utilities manager 1805 can include an indication of the offline mode. An exemplary help message 2305 explaining offline mode is illustrated in FIG. 23B. As indicated in the help information, the offline mode may allow the user to access an view previously downloaded content from the user's library but does not provide access to allow the user to browse or download online content from the media service.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing a user interface for a client application, the client application for providing access to a media service, the method comprising:
    receiving a user input to launch an application;
    generating a representation of a theatrical stage for presenting graphical elements related to multimedia content provided by the media service;
    after receiving the user launch input, displaying a first view of the stage, wherein the first view of the stage includes a portion of the stage less than all of the stage, wherein a plurality of graphical elements are displayed above a floor of the stage, and wherein each of the plurality of graphical elements represents a content item available through media service;
    receiving a user selection of one of the plurality of graphical elements;
    in response to the user selection, displaying a first view of a selected-element animation, wherein the first view of the selected element is animated to give an appearance of movement along a z-axis towards the user;
    receiving a user selection to view a video preview of the content item represented by one of the plurality of graphical elements;
    displaying the selected video preview in a video preview window;
    while displaying the selected video preview in the video preview window, moving the video preview window within the first view of the stage by sliding the video preview window from a first location to a second location within the first view of the stage;
    receiving a user selection to view a second view of the selected one of the plurality of graphical elements, the second view displaying different information about the selected one of the plurality of graphical elements than the first view; and
    in response to the user selection to view the second view, animating the first view in a manner to give an appearance of the selected one of the graphical elements flipping over from the first view to the second view such that the first view and the second view appear to be on opposite sides of a box.

2. The method of claim 1, wherein the first view of the stage comprises at least a first pane and a second pane, the first pane and the second pane including different portions of the stage.

3. The method of claim 2, wherein the first pane includes the first plurality of graphical elements representing content items available through the media service.

4. The method of claim 3, further comprising, wherein the selected element animation comprises displaying the selected graphical element with a fly out effect within the first pane.

5. The method of claim 2, further comprising displaying a first navigation element in the second pane, the first navigation element indicating a direction to additional portions of the stage.

6. The method of claim 5, further comprising:
    in response to a user selection of the first navigation element, replacing the first pane with a second navigation element indicating a direction of additional portions of the stage;
    moving the second pane to a previous location of the first pane; and
    displaying a third pane, the third pane including a portion of the stage represented by the first navigation element.

7. The method of claim 6, wherein the third pane includes a second plurality of graphical elements representing content items cached by the client application.

8. The method of claim 7, further comprising, in response to a user selection of one of the second plurality of graphical elements, displaying the selected element with a fly out effect in the third pane.

9. The method of claim 2, further comprising:
displaying a spotlight element in a background of the user interface, the spotlight element indicating a current focus for the user interface.

10. The method of claim 9, wherein indicating the current focus comprises indicating a pane containing an element having focus.

11. The method of claim 10, wherein indicating the current focus comprises moving the spotlight element to the pane having focus.

12. The method of claim 9, further comprising changing the spotlight element in response to a user action.

13. The method of claim 12, wherein changing the spotlight element comprises temporarily increasing a brightness of the spotlight element.

14. The method of claim 12, wherein the user action comprises selecting an element of the user interface.

15. The method of claim 6, wherein the second pane includes the video preview window.

16. A machine-readable storage device having stored thereon a series of instructions which, when executed by a processor, cause the processor to provide a user interface for accessing a media service by:
generating a representation of a theatrical stage for presenting graphical elements related to multimedia content provided by the media service;
displaying a display comprising a first view of the stage, wherein the first view of the stage includes a portion of the stage less than all of the stage, wherein the display includes a user-selectable first navigation element;
receiving a user selection of the first navigation element; and
upon receiving the user selection of the first navigation element, animating the display to change from a first view of the stage to a second view of the stage, wherein the second view of the stage includes a portion of the stage less than all of the stage, and wherein the first and second views of the stage include different portions of the stage;
receiving a user selection to view a video preview of multimedia content related to one of the graphical elements;
displaying the selected video preview in a video preview window;
wherein animating the display comprises, while displaying the selected video preview in the video preview window, moving the video preview window by sliding the video preview window from a first location within the first view of the stage to a second location within the second view of the stage;
receiving a user selection to view a second view of a selected one of the plurality of graphical elements, the second view displaying different information about the selected one of the plurality of graphical elements than the first view; and
in response to the user selection to view the second view of the selected one of the plurality of graphical elements, animating the first view in a manner to give an appearance of the selected one of the graphical elements flipping over from the first view to the second view such that the first view and the second view appear to be on opposite sides of a box.

17. The machine-readable storage device of claim 16, wherein the first view of the stage comprises at least a first pane and a second pane, the first pane and the second pane including different portions of the stage.

18. The machine-readable storage device of claim 17, wherein the first pane includes a first plurality of graphical elements representing content items available through the media service.

19. The machine-readable storage device of claim 18, wherein the instructions, when executed by the processor, further cause the processor to provide the interface for accessing the media service by, in response to a user selection of one of the first plurality of graphical elements, displaying the selected graphical element with a fly out effect within the first pane.

20. The machine-readable storage device of claim 17, wherein the first navigation element is displayed in the second pane, the first navigation element indicating a direction to additional portions of the stage.

21. The machine-readable storage device of claim 20, wherein the instructions, when executed by the processor, further cause the processor to provide the interface for accessing the media service by:
upon receiving the user selection of the first navigation element, replacing the first pane with a second navigation element indicating a direction of additional portions of the stage;
moving the second pane to a previous location of the first pane; and
displaying a third pane, the third pane including a portion of the stage represented by the first navigation element.

22. The machine-readable storage device of claim 21, wherein the third pane includes a second plurality of graphical elements representing content items cached by the client application.

23. The machine-readable storage device of claim 22, wherein the instructions, when executed by the processor, further cause the processor to provide the interface for accessing the media service by, in response to a user selection of one of the second plurality of graphical elements, displaying the selected element with a fly out effect in the third pane.

24. The machine-readable storage device of claim 17, wherein the instructions, when executed by the processor, further cause the processor to provide the interface for accessing the media service by:
displaying a spotlight element in a background of the user interface, the spotlight element indicting a current focus for the user interface.

25. The machine-readable storage device of claim 24, wherein indicating the current focus comprises indicating a pane containing an element having focus.

26. The machine-readable storage device of claim 25, wherein indicating the current focus comprises moving the spotlight element to the pane having focus.

27. The machine-readable storage device of claim 24, wherein the instructions, when executed by the processor, further cause the processor to provide the interface for accessing the media service by changing the spotlight element in response to a user action.

28. The machine-readable storage device of claim 27, wherein changing the spotlight element comprises temporarily increasing a brightness of the spotlight element.

29. The machine-readable storage device of claim 27, wherein the user action comprises selecting an element of the user interface.

30. The machine-readable storage device of claim 21, wherein the second pane includes the video preview window.

31. A method of providing a user interface for a client application, the client application for providing access to a media service, the method comprising:
- receiving a user input to launch an application;
- generating a representation of a theatrical stage for presenting graphical elements related to multimedia content provided by the media service;
- after receiving the user launch input, displaying a user interface comprising a first view of the stage, wherein the first view of the stage includes a portion of the stage less than all of the stage, wherein a plurality of graphical elements are displayed above a floor of the stage, and wherein each of the plurality of graphical elements represents a content item available through media service;
- receiving a navigation input from the user, the navigation input indicating a position of the user interface corresponding to a position of a user input device; and
- displaying a spotlight graphic or visual effect on the first view of the stage at the position of the user interface;
- receiving a user selection to view a video preview of multimedia content related to one of the plurality of graphical elements;
- displaying the selected video preview in a video preview window;
- while displaying the selected video preview in the video preview window, moving the video preview window within the first view of the stage by sliding the video preview window from a first location to a second location within the first view of the stage;
- receiving a user selection to view a second view of the selected graphical element, the second view displaying different information about the selected graphical element than the first view; and
- in response to the user selection to view the second view, animating the first view in a manner to give an appearance of the selected graphical element flipping over from the first view to the second view such that the first view and the second view appear to be on opposite sides of a box.

32. A method of providing a user interface for a client application, the client application for providing access to a media service, the method comprising:
- generating a representation of a stage for presenting graphical elements related to multimedia content provided by the media service;
- displaying a first view of the stage,
    - wherein the first view of the stage includes a portion of the stage less than all of the stage,
    - wherein the first view of the stage comprises at least a first pane and a second pane, the first pane and the second pane including different portions of the stage, and
    - wherein the first pane includes a first plurality of graphical elements representing content items available through the media service;
- in response to a user selection of one of the plurality of graphical elements, displaying a first view of the selected graphical element with a fly out effect within the first pane;
- receiving a user selection to view a video preview of multimedia content related to one of the graphical elements;
- in response to the user selection to view the video preview, displaying the selected video preview in a video preview window;
- while displaying the selected video preview in the video preview window, moving the video preview window by sliding the video preview window from a first location to a second location within the first view of the stage;
- receiving a user selection to view a second view of the selected graphical element, the second view displaying different information about the selected graphical element than the first view; and
- in response to the user selection to view the second view, animating the first view in a manner to give an appearance of the selected graphical element flipping over from the first view to the second view such that the first view and the second view appear to be on opposite sides of a box.

\* \* \* \* \*